(12) United States Patent
Ukai et al.

(10) Patent No.: US 6,571,329 B1
(45) Date of Patent: May 27, 2003

(54) DETECTION OF OVERWRITE MODIFICATION BY PRECEDING INSTRUCTION POSSIBILITY OF FETCHED INSTRUCTION CODE USING FETCHED INSTRUCTIONS COUNTER AND STORE TARGET ADDRESS

(75) Inventors: Masaki Ukai, Kanagawa (JP); Aiichiro Inoue, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/532,832

(22) Filed: Mar. 21, 2000

(65) Prior Publication Data (65)

(30) Foreign Application Priority Data

Aug. 24, 1999 (JP) ............................................. 11-236811

(51) Int. Cl.[7] ................................................. G06F 9/38
(52) U.S. Cl. ........................ 712/205; 711/141; 711/146; 712/207; 712/216; 712/226
(58) Field of Search ................................. 711/141, 146; 712/205, 207, 216, 226

(56) References Cited

U.S. PATENT DOCUMENTS

| 5,721,865 | A | | 2/1998 | Shintani et al. ............ 711/137 |
| 5,742,791 | A | * | 4/1998 | Mahalingaiah et al. ..... 711/146 |
| 5,826,073 | A | * | 10/1998 | Ben-Meir et al. ........... 712/226 |
| 5,835,949 | A | * | 11/1998 | Quattromani et al. ....... 711/135 |
| 6,009,516 | A | * | 12/1999 | Steiss et al. ................. 712/244 |
| 6,237,088 | B1 | * | 5/2001 | Zaidi .......................... 712/239 |
| 6,405,307 | B1 | * | 6/2002 | Murty et al. ................. 712/239 |
| 6,415,360 | B1 | * | 7/2002 | Hughes et al. .............. 711/139 |

FOREIGN PATENT DOCUMENTS

| JP | 63-311438 | 12/1988 |
| JP | 4-246728 | 9/1992 |
| JP | 8-194615 | 7/1996 |

* cited by examiner

*Primary Examiner*—Kenneth S. Kim
(74) *Attorney, Agent, or Firm*—Staas & Halsey LLP

(57) ABSTRACT

The present invention aims at improving the performance of the process of an information processing apparatus which includes an instruction fetch port, and can detect the possibility for the overwrite of an instruction fetched from the instruction fetch port by correctly detecting the length of an instruction sequence already stored in an instruction buffer for storing an instruction to be fetched before the execution of instructions, and an instruction to be determined in the instructions being or already executed, and by correctly detecting the possibility for the overwrite of the contents of an instruction fetched from one instruction port. The information processing apparatus comprises: an instruction fetch counter unit for counting the length of an instruction sequence containing all instructions which are fetched before the last fetched instruction. The instructions and the last fetched instruction have sequential addresses; and an instruction overwrite possibility determination unit for using an address of an instruction at a specified position in all instruction sequences, a storage target address at which an execution result of a completed store instruction is stored, and an output value of the instruction fetch counter unit, and detecting a possibility for the overwrite of an instruction wherein at least a part of the range of the storage target address overlaps the address of an instruction in all instruction sequences, and at least a part of the instruction sequences is overwritten.

25 Claims, 24 Drawing Sheets

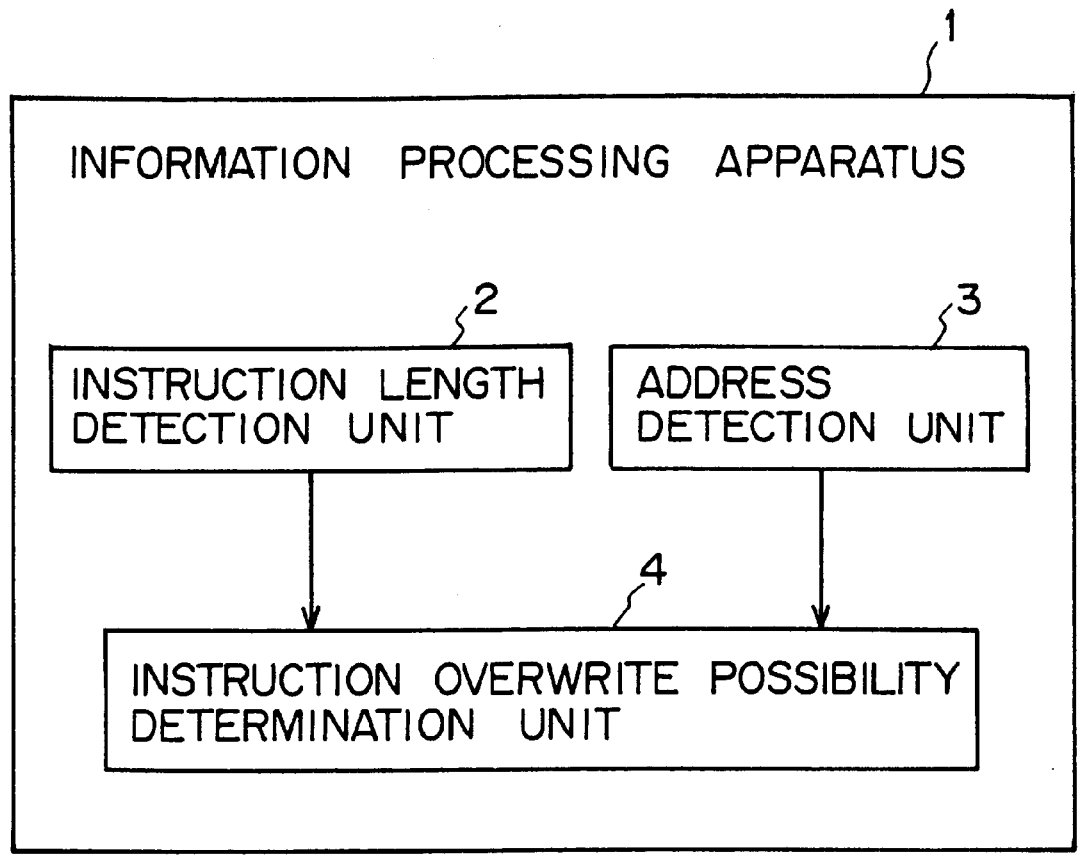
F I G. 1

DETECTION OF OVERWRITE MODIFICATION BY PRECEDING INSTRUCTION POSSIBILITY OF FETCHED INSTRUCTION CODE USING FETCHED INSTRUCTIONS COUNTER AND STORE TARGET ADDRESS

BACKGROUND OF THE INVENTION

1. Field of the Invention

The present invention relates to an information processing apparatus for use in a pipeline process system, and more specifically to an information processing apparatus for detecting a possibility that the contents of the instructions subsequent to an instruction, for example, a store instruction, to write an instruction execution result to a main storage device can be overwritten by the instruction.

2. Description of the Related Art

In an information processing apparatus for use in a pipeline process system, a superscalar process system, an out-of-order process system, etc., instructions subsequent to an instruction can be sequentially fetched (or prefetched) before the completion of the execution of the instruction, put in a pipeline, and sequentially executed, thereby improving the performance of the entire operation.

Assume that an instruction has already been executed and its execution result is written to the main storage device, if the contents of an instruction to be overwritten are already prefetched and stored in, for example, an instruction buffer, then it is obvious that the instruction before the overwriting process is not to be executed, but the instruction after the overwriting process is to be executed. Thus, there is a possibility that the contents of an already fetched instruction are overwritten upon completion of a preceding store instruction. Therefore, it is necessary to control the execution of an instruction with the possibility for the overwrite of the instruction taken into account.

Whether or not the contents of an instruction should be overwritten should be determined before the completion of the execution of a store instruction to execute the overwriting process. Otherwise, if the store instruction is to overwrite an instruction immediately after the store instruction, there is a strong possibility that the instruction before the overwriting process can be erroneously executed. Therefore, a method of quickly determining the possibility for the overwrite of an instruction is either to shorten the determination time using a simple overwrite determination circuit, or to reserve the time taken to determine the possibility for the overwriting process by limiting the flow of an instruction pipeline when there is a store instruction to write an instruction execution result to the main storage device.

When the above described store instruction exists in the conventional technology, an instruction fetching operation is held until the execution result of the store instruction is determined, and a simple determination circuit is designed by controlling the length of an instruction sequence in an instruction pipeline to be equal to or shorter than a predetermined length, thereby shortening the time taken to determine the possibility for an overwriting process. However, since a store instruction is frequently used, each time the store instruction appears in an instruction sequence, the instruction pipeline stops, thereby considerably lowering the performance of the entire process.

SUMMARY OF THE INVENTION

The present invention aims at improving the performance of the process of an information processing apparatus which includes an instruction fetch port, and can detect the possibility for the overwrite of an instruction fetched from the instruction fetch port by correctly detecting the length of an instruction sequence already stored in an instruction buffer for storing an instruction to be fetched before the execution of instructions, and an instruction to be determined in the instructions being or already executed, and by correctly detecting the possibility for the overwrite of the contents of an instruction fetched from one instruction port.

The feature of the present invention is to include an information processing apparatus which has one or more instruction fetch ports for fetching an instruction, and detects the possibility for the overwrite of an instruction fetched from the instruction fetch port. The information processing apparatus includes an instruction fetch counter unit for counting the lengths of all instruction sequences containing instructions fetched from an instruction fetch port, containing the last fetched instruction, containing instructions fetched before the last fetched instruction, and containing instructions whose instruction addresses are in series with the address of the last fetched instruction; and an instruction overwrite possibility determination unit for detecting the possibility for an instruction overwriting process in which at least a part of the range of the addresses to be stored overlaps the addresses of the instructions in all instruction sequences, and at least a part of the instruction sequences is overwritten according to the address at a specified position in all instruction sequences, the storage target address at which the execution result of a completed store instruction is stored, and an output value of the instruction fetch counter unit.

With the information processing apparatus according to the present invention, it is possible to quickly determine the possibility for the overwrite of a subsequent instruction already fetched or executed when a storage target address at which an execution result of a store instruction is stored is determined, thereby requiring no limit of the flow of an instruction pipeline containing a store instruction. Accordingly, the performance of the information processing apparatus can be efficiently improved.

BRIEF DESCRIPTION OF THE DRAWINGS

FIG. 1 is a block diagram of the configuration showing the principle of the present invention;

DESCRIPTION OF THE PREFERRED EMBODIMENTS

Figure 2:
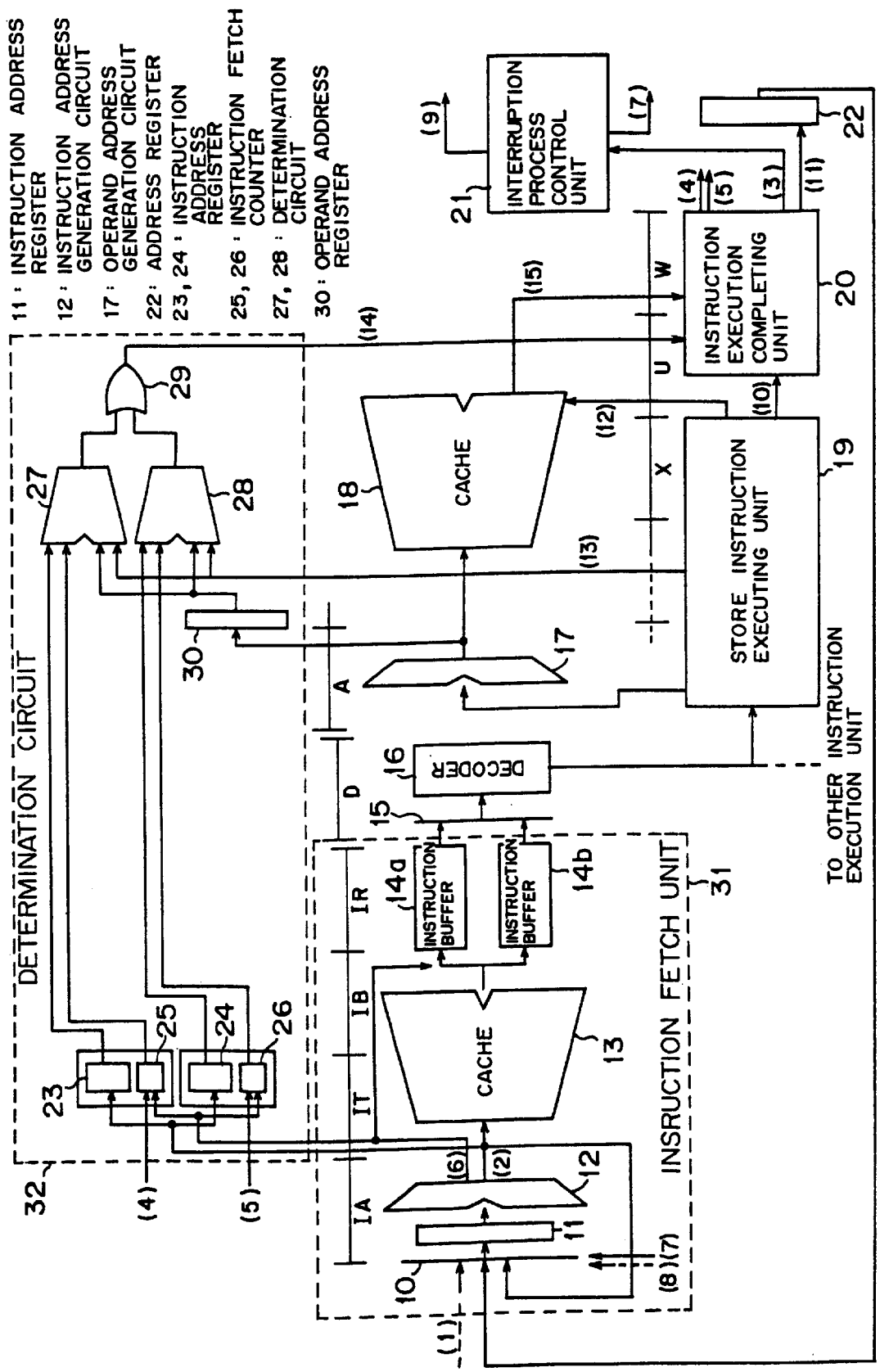
FIG. 2 is a block diagram of the general configuration of the information processing apparatus for detecting the possibility for the overwrite of an instruction according to the present invention.

The embodiments of the present invention are described below in detail by referring to the attached drawings.

FIG. 1 is a block diagram of the configuration showing the principle of the present invention. Actually, FIG. 1 is a block diagram of the configuration showing the principle of the information processing apparatus for detecting the overwrite possibility of an instruction fetched from one or more instruction fetch ports included to fetch an instruction.

In FIG. 1, an instruction length detection unit 2 is, for example, an instruction fetch counter, for detecting the lengths of all instruction sequences containing the last fetched instruction and subsequent to the instruction. According to an embodiment of the present invention, when the lengths of instruction sequences fetched at a time are constant, the length of an instruction sequence is detected by counting the times of the fetching process. According to another embodiment of the present invention, the length of an instruction sequence can be detected by adding the lengths of the instruction sequences fetched at a time, thereby detecting the length of an instruction sequence.

An address detection unit 3 detects the address of an instruction at a specific position in the instruction sequence whose length has been detected, for example, the address IAR of the instruction fetched last and stored in the instruction buffer, or the next instruction, and the address OAR to be stored at which an execution result of a completed store instruction is stored.

An instruction overwrite possibility determination unit 4 detects the possibility for the overwrite of an instruction in which the contents of an instruction already stored in the instruction buffer, an instruction whose execution has been started, etc. can be overwritten by storing the execution result of a store instruction in the main storage device using the outputs from the instruction length detection unit 2 and the address detection unit 3.

According to the embodiment of the present invention, the instruction overwrite possibility determination unit 4 can detect a possibility for the overwrite of an instruction further using the data length of stored data as an execution result of the store instruction stored at the above described storage target address.

In addition, according to the embodiment of the present invention, the information processing apparatus can comprise an instruction execution completion control unit for completing the execution of one instruction at a time from the moment when the instruction overwrite possibility determination unit 4 determines that there is a possibility for the overwrite of an instruction to the completion of a store instruction.

By the determination of the overwrite of an instruction, and by a control unit, the conventional method of limiting an instruction fetching operation each time a store instruction appears is not required. Especially, in most instruction sequences in which an instruction is not actually overwritten by a store instruction, outstanding improvement can be expected in performance. Furthermore, in circuit scale, a control circuit can be provided only depending on the number of instruction fetch ports regardless of the number of the stages of an instruction or the size of an instruction buffer, thereby simplifying the structure of the circuit.

According to the present invention, an error in determining the overwrite of an instruction can be suppressed by determining the discrimination inequality described later using a multiple input adder. The above described information processing apparatus includes an instruction fetch counter unit for counting the length of all instruction sequences containing instructions fetched from an instruction fetch port, containing the last fetched instruction, containing instructions fetched before the last fetched instruction, and containing instructions whose instruction addresses are in series with the address of the last fetched instruction; and an instruction overwrite possibility determination unit, for example, a multiple input adder, for detecting the possibility for an instruction overwriting process in which at least a part of the range of the addresses to be stored overlaps the addresses of the instructions in all instruction sequences, and at least a part of the instruction sequences is overwritten according to the address at a specified position in all instruction sequences, the storage target address at which the execution result of a completed store instruction is stored, and an output value of the instruction fetch counter unit.

The instruction overwrite possibility determination unit, for example, a multiple input adder, can detect a possibility for the overwrite of an instruction using the data length of stored data obtained as an execution result of a store instruction stored at the storage target address.

Thus, using the multiple input adder, a determination error can be avoided in principle. However, especially in the out-of-order system, the store instruction in problem can be quickly completed. Therefore, the time enough to guarantee a correct computation result may not be reserved using the multiple input adder. In such a case, it is necessary to use a simple circuit to control the delay of a signal. As a result, according to the embodiment of the present invention, a two-input adder in place of the multiple input adder, a selector circuit, and a simple operation circuit can be combined for correct determination and a high-speed operation.

According to the embodiment of the present invention, the instruction overwrite possibility determination unit 4 can comprise a subtraction circuit for outputting a correct operation result only when the absolute value obtained as a subtraction result is small. This subtraction circuit comprises an upper subtraction circuit and a lower subtraction circuit for individually performing a subtracting operation on a higher bit and a lower bit respectively. When the output of the upper subtraction circuit is 0, −1, or −2, a signal indicating that the absolute value obtained as a subtraction result and the output from the lower subtraction circuit can be output as a subtraction result depending on a carried output from the lower subtraction circuit and a sign of the subtraction result.

The subtraction circuit is used to reduce the delay of a signal and determine the overwrite of an instruction within a predetermined time. That is, when there is a strong possibility for the overwrite of an instruction, the absolute value of the difference between the storage target address and the address of the instruction at the specific position is small. In this case, a correct computation result is required. When the absolute value of the difference is large, there is no possibility for the overwrite. Thus, if it is determined that the difference is large, it proves that there is no possibility for the overwrite because both fetched instruction sequence and storage target data are short.

Furthermore, according to the embodiment of the present invention, the instruction overwrite possibility determination unit can comprise an operation circuit for performing an adding or subtracting operation when there is a difference in number of digits between two values to be processed. The operation circuit performs an adding or subtracting operation for data width equal to or larger than the smaller value of the absolute values on the lower bit, and outputs an operation result. The operation circuit increments or decrements by 1 the higher bit of a larger value of the absolute values when there is a carried output of an operation result on the higher bit, and outputs an operation result of the higher bit. When there is no carried output, the higher bit of the larger value of the absolute values is output as is as an operation result.

As described above, according to the present invention, it is possible to quickly determine a possibility for the overwrite of already fetched or executed subsequent instructions when a storage target address at which an execution result by a store instruction is determined, thereby requiring no limit of the flow of an instruction pipeline containing a store instruction.

FIG. 2 shows a block diagram of the entire configuration of the information processing apparatus for detecting a possibility for the overwrite of an instruction according to the present invention. The information processing apparatus is described as operating in the superscalar system and the out-of-order process system. First, the entire operations are described as follows.

In an instruction fetch unit 31, an instruction address generation circuit 12 generates an instruction address using the contents selected by a selector 10 and stored in an instruction address register 11, and the contents of the instruction fetched are read from a cache 13, and stored in either of two instruction buffers 14a and 14b. These operations are performed through an instruction fetch pipeline, that is, a pipeline having 4 stages of an IA cycle for generation of an instruction address, an IT cycle for conversion of an address in the cache 13, an IB cycle for setting a fetched instruction in an instruction buffer, and an IR cycle for guaranteeing that a fetched instruction is correct.

An instruction output from either the instruction buffer 14a or 14b is decoded by an instruction decoder 16 through a selector 15. When the instruction is a store instruction, it is passed to a store instruction executing unit 19. When the instruction is any of other types, it is passed to one of other instruction execution units. When it is a store instruction, an operand address generation circuit 17 computes an operand address at which an execution result of the store instruction is to be stored at an instruction from the store instruction executing unit 19, and transmits it to a cache 18. When the process of the store instruction executing unit 19 is completed, the process of an instruction execution completing unit starts.

The instruction execution pipeline includes a D cycle for decoding an instruction, an A cycle for computation of an operand address, an X cycle for execution of an instruction in an instruction execution unit such as the store instruction executing unit 19, a U cycle for update of a register and memory, a W cycle for an execution completion process such as a write of an instruction execution result, etc. The instruction fetch unit, the instruction decoder, the operand address generation circuit, the instruction execution unit, and the execution completing unit operate in association with each other. However, since the out-of-order system is adopted in principle, instructions determined to be processed can be sequentially executed regardless of the order of fetching the instructions.

The instruction fetch unit 31 comprises two instruction fetch ports. Each of the instruction fetch ports A and B reads, for example, a 16-byte instruction sequence in one instruction fetching operation, and the instruction sequence is stored in the 48-byte (for three reading operations) instruction buffer 14a or 14b. Assuming that the length of an instruction to be fetched in one instruction fetching operation is fixed to 16 bytes, the value of an instruction fetch counter 25 or 26 corresponding to an instruction fetch port is incremented when the instruction fetch request is issued. The instruction address on the IT cycle is stored in instruction address registers 23 and 24 corresponding to the instruction fetch ports A and B respectively.

Overwrite possibility determination circuits 27 and 28 for a subsequent instruction executed with a store instruction have an important function in a determination circuit unit 32 for determining a possibility for the overwrite of an instruction. The overwrite possibility determination circuits 27 and 28 output a signal indicating that there is a possibility for the overwrite respectively to two instruction fetch ports A and B to the instruction execution completing unit 20 through an OR gate 29. To determine a possibility for the overwrite, the stored contents of the instruction address registers 23 and 24, and the instruction fetch counters 25 and 26 corresponding to respective instruction fetch ports, and the stored contents of an operand address register 30 for storage of an operand address at which the instruction execution result of a store instruction are stored, that is, an output of the operand address generation circuit 17, are used.

In controlling an instruction, one of the two instruction fetch ports A and B is a current port. Instructions are sequentially decoded from the instruction buffer 14a or 14B on the current port side, and are passed through the instruction execution pipeline. The other instruction fetch port which is not a current fetch port reads a branch target instruction sequence through a branch prediction mechanism for predicting whether or not branching occurs for a branch instruction. The operations of an instruction fetch port are interrupted when the instruction buffer 14a or 14b becomes full. When a branch occurs according to a branch prediction, the corresponding port functions as a current port to execute an instruction, and the instruction fetching operation is resumed.

In this case, the instruction fetch port which has been a current port is not used any more. The port is released, and the instruction fetch counter 25 or 26 corresponding to the port is reset. When an instruction is refetched due to the failure of a branch prediction, the occurrence of an interruption process, etc., that is, when an instruction process is retried, all instruction fetch ports are released, and all instruction fetch counters 25 and 26 are reset.

The operations of the information processing apparatus shown in FIG. 2 are described below in detail with the flow of a signal emphasized. (1) indicates an instruction address when a branch occurs according to a branch prediction, or an instruction is refetched. When a signal (8) indicating a branch according to the branch prediction or an instruction refetching operation is transmitted as a selection control signal to the selector 10, the signal (1) is selected.

When a process state signal (7) output from an interruption process control unit 21 is turned on, the contents of an instruction address register 22 is selected by the selector 10. This process state signal is a signal indicating a normal execution state in which no interruption occurs. An instruction can be correctly executed by refetching a subsequent instruction which may be overwritten and executed by fetching an instruction using the contents of the instruction address register 22 storing an instruction address of an instruction to be completely executed next output from the instruction execution completing unit 20 when the process state signal is temporarily turned off, and is then turned on again when the store instruction which may cause an overwrite is completed.

Furthermore, when the selection control signals (7) and (8) are not received, the selector 10 selects the address (2) of a fetched instruction output by the instruction address generation circuit 12, and provides it for the instruction address register 11, thereby generating the address of the next instruction by the instruction address generation circuit 12.

For the determination circuit unit 32, clear signals (4) and (5) for the instruction fetch ports A and B are externally provided for the instruction fetch counters 25 and 26 respectively. When there is a possibility for the overwrite of an instruction, a signal (14) indicating a possibility for the overwrite of a subsequent instruction is output from the OR gate 29 to the instruction execution completing unit 20.

The store instruction executing unit 19 provides store data (12) for the cache 18, and the length (13) of the data stored as an execution result of a store instruction is provided for the overwrite possibility determination circuits 27 and 28 in the determination circuit unit 32. In addition, an instruction completion report signal (10) is output to the instruction execution completing unit 20. The present embodiment is described with the execution result stored in the register (not shown in the attached drawings) in the store instruction executing unit 19 written to the (cache) memory. It is obvious that the present invention can also be applied when data is written from memory to memory.

A store data receipt signal (15) from the main storage unit is provided from the cache 18 for the instruction execution completing unit 20. An instruction address (11) of an instruction to be next executed and completed is provided from the instruction execution completing unit 20 for the instruction address register 22. A signal (3) indicating the interruption or discard of a subsequent instruction is output to the interruption process control unit 21 when it is determined that there is a possibility for the overwrite of an instruction. In addition, the clear signals (4) and (5) are output corresponding to the respective instruction fetch ports of the instruction fetch counters 25 and 26 in the determination circuit unit 32 as described above.

An interruption occurrence signal (9) indicating the interruption of the execution of an instruction (same as a RESTORE_STATE signal described later) is output from the interruption process control unit 21 when a signal (3) indicating the interruption or discard of a subsequent instruction is input from the instruction execution completing unit 20. In addition, the above described process state signal (7) is output as a selection control signal to the selector 10 after a subsequent instruction is interrupted or discarded.

Figure 3:
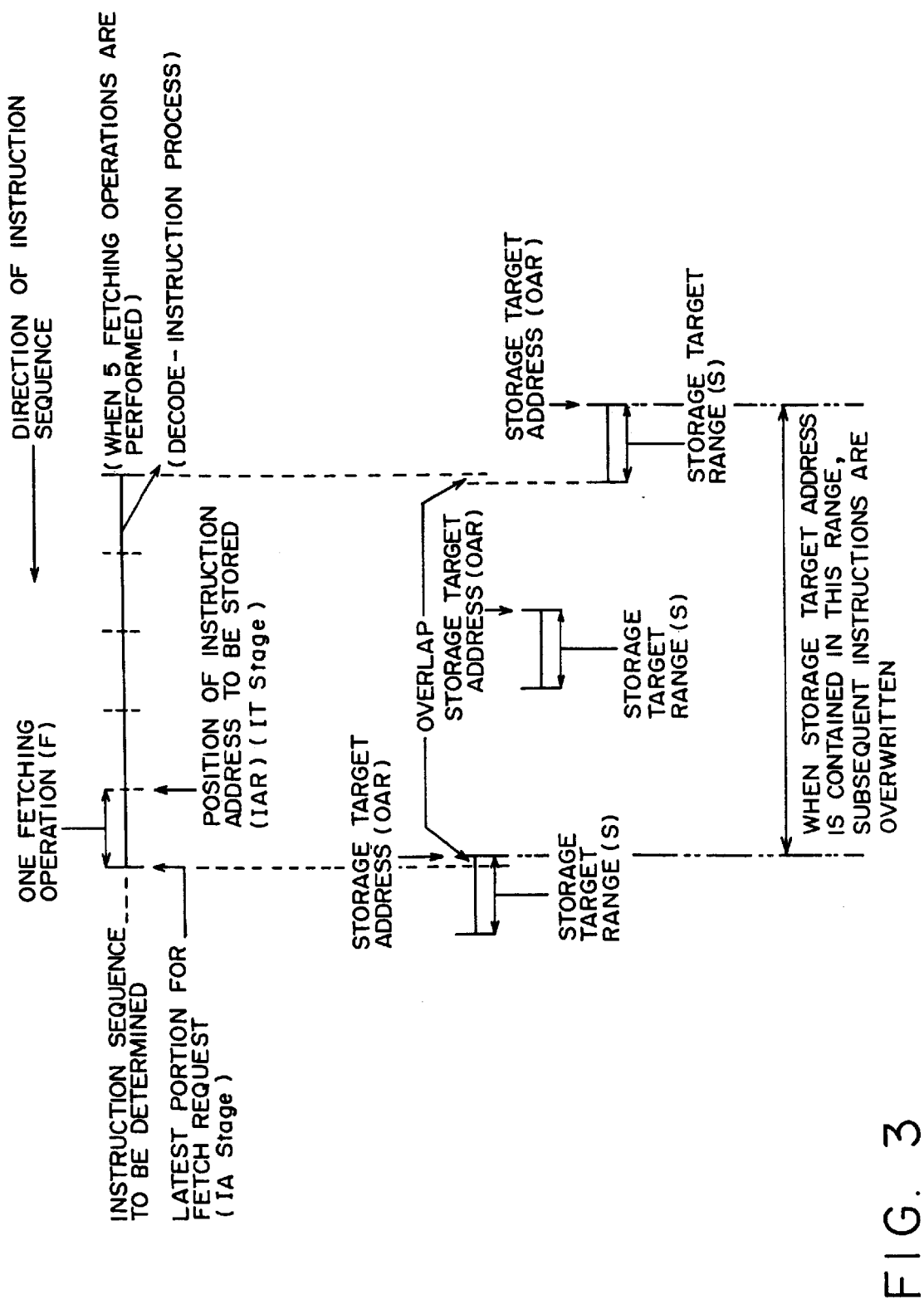
FIG. 3 shows an instruction overwrite possibility detecting method.

FIG. 3 shows the instruction overwrite possibility detecting method according to the present invention. In FIG. 3, it is assumed that the instruction buffer shown in FIG. 2 stores instruction sequences of instructions fetched in five fetching operations, and the rightmost instruction sequence, that is, the first fetched instruction sequence, is decoded and used in the instruction process. Then, it is assumed that the address of the instruction fetched in the last fetching operation (F) indicates the IAR to be provided for any of the two instruction address registers on the above described IT cycle.

In FIG. 3, depending on the position of the storage target address OAR, that is, the operand address at which the execution result of the above described store instruction is stored, and depending on the storage target range S, that is, the length of the stored data, it is determined that there is a possibility for the overwrite of an instruction sequence obtained as a result of n fetching operations from the storage target range when the following inequality exists.

$$-F < IAR - OAR < F \times (n-1) + S \quad (1)$$

where, in the right inequality, it is determined that there is a possibility for the overwrite of an instruction if the OAR is located on the right or at the center in FIG. 3 when IAR−OAR is positive. In the left inequality, it is determined that there is a possibility for the overwrite of an instruction if the OAR is located on the left in FIG. 3 when IAR−OAR is negative.

In FIG. 3, it is assumed that the first fetched instruction sequence in the instruction sequences fetched in five fetching operations is decoded and used in the instruction process. However, it is rather a special case according to the present invention. That is, an instruction sequence decoded and used in the instruction process can be the third instruction sequence from the right which has been fetched in the third fetching operation.

In the case shown in FIG. 3, the instructions fetched in five fetching operations are all stored in the instruction buffer 14a or 14b shown in FIG. 2. Therefore, all instruction sequences to be checked for a possibility for the overwrite of an instruction are stored in the instruction buffer. However, if the instruction sequence fetched in the third fetching operation is decoded and used in the instruction process, then the execution of instructions on the instruction sequences fetched in the previous two fetching operations has been already started. Therefore, there is a possibility that a part of the instruction execution has already been completed.

That is, according to the embodiment of the present invention, to start with a branch occurring at a branch instruction, all instruction sequences fetched from one instruction fetch port subsequent to the last fetched instruction are checked for a possibility for the overwrite of an instruction. The instructions in the instruction sequence to be checked are not only stored in the instruction buffer, but also can have been started or completed in execution.

The length of the instruction sequence to be checked for a possibility for the overwrite of a subsequent instruction is counted by the above described instruction fetch counter. The counting starts, for example, at the point where an instruction sequence is switched into another at a branch instruction by which a branch occurs, that is, the point where a fetch port is switched. The length is counted from a branch target instruction executed by a branch instruction, or from the point where a pipeline is cleared after an instruction is refetched when a branch does not occur although it is predicted. If a branch instruction which actually causes a branch is long awaited, an instruction sequence to be checked is considerably long. In this case, it is determined whether or not there is a possibility for the overwrite of the long instruction sequence. Therefore, n in the above described inequality (1) does not correspond to the length of an instruction sequence stored in the instruction buffer as described by referring to FIG. 3, but corresponds to the length of the instruction sequence of instructions whose addresses are serial up to the last fetched instruction from the point where a branch occurs by a branch instruction.

When an instruction fetch port is switched, it is determined on the current port side whether or not there is a possibility for the overwrite of the instruction sequence before branching occurs. When an instruction is refetched, the previous instructions have been executed and therefore are not checked for a possibility for the overwrite of an instruction, thereby covering the range to be checked for the influence of the store instruction subsequent to clearing the instruction fetch counter.

As described later, a fetch port is released containing the clear of the instruction fetch counter when one of the following two conditions is met. The first condition is to detect branching occurring as a branch is predicted, switch a current fetch port into the port on the branch target, and require the clear of the instruction fetch port which has been a current port. The second condition is to require the clear of all instruction fetch ports and all execution pipelines in association with an instruction refetching operation in which subsequent correct instruction sequences are reprocessed from an instruction fetching operation and an interrupting operation due to, for example, a failure in a branch prediction, etc. When one of the conditions is met, the instruction fetch counter described later is cleared.

Figure 4:
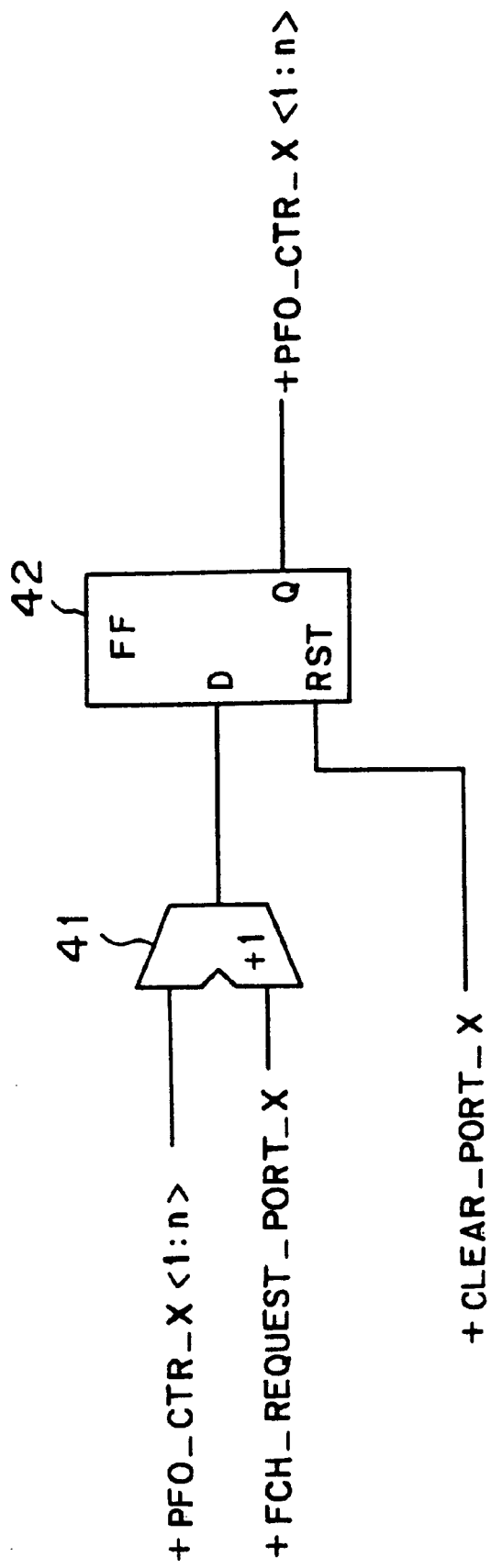
FIG. 4 is a block diagram showing an example of the configuration of the instruction fetch counter.

FIG. 4 is a block diagram showing an example of the configuration of the instruction fetch counter. In FIG. 4, the instruction fetch counter comprises an incrementer 41 and a data flipflop (D-FF) 42. PFO_CTR_X (prefetch order_counter_x, n bits) is input as a current counter value to one input terminal of the incrementer 41. The X can be A or B corresponding to the instruction fetch port. A fetch request FCH_REQUEST_PORT_X (FCH_request_port_X) to the corresponding port A or B is input to the other input terminal of the incrementer 41. When a fetch request is issued, the value of PFO_CTR_X as a counter value is incremented, and input to the D-FF 42. When the instruction buffer 14a or 14b shown in FIG. 2 is full, and there is no available space, an FCH_REQUEST_PORT_X signal is not output, and the counter value PFO_CTR_X is not incremented.

The output Q of the D-FF 42 is PFO_CTR_X as a counter value, the value input to the D input terminal when the clock is input is output as a counter value, and the counter value is reset when a signal clear_port_X (CLEAR_PORT_X) for release of the instruction fetch port is input.

Figure 5:
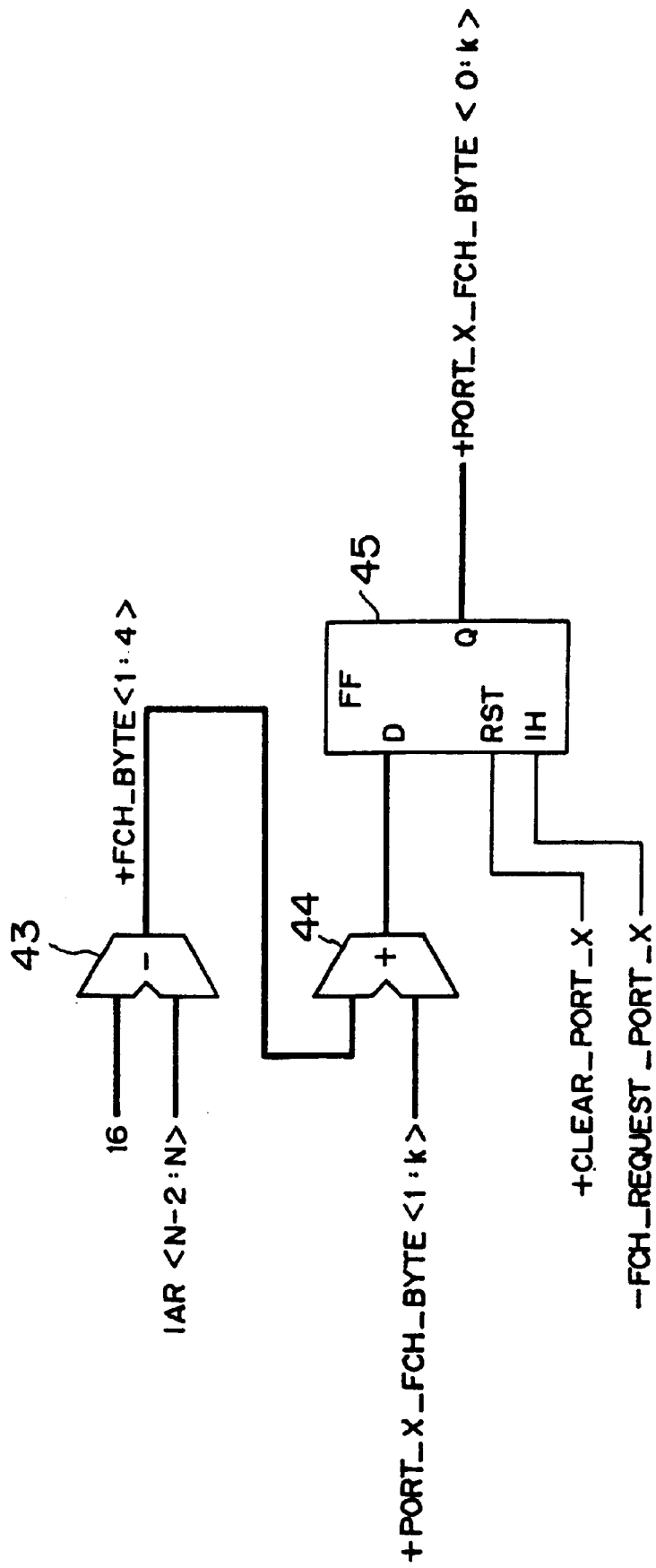
FIG. 5 is a block diagram showing another example of the configuration of the instruction fetch counter.

FIG. 5 is a block diagram showing another example of the configuration of the instruction fetch counter. The instruction fetch counter shown in FIG. 4 counts the times of the fetching operation when the length of an instruction sequence fetched in one fetching operation is fixed. On the other hand, the counter shown in FIG. 5 accumulates the number of bytes of the fetched instructions.

In FIG. 5, when a branch target instruction in a branch instruction is fetched, or when an instruction is refetched, the length of the instruction sequence fetched in the first fetching operation is not limited to 16 bytes, but (16−x) bytes are fetched depending on the lower 3 bits (=x) of the leading address of a fetched instruction. When subsequent instructions are sequentially fetched, 16 bytes are fetched in one fetching operation because instructions are aligned in 8-byte units.

A subtracter 43 subtracts the lower 3 bits of the leading address of a fetched instruction from 16, and 16−x bytes are obtained as FCH_BYTE (fetch_byte, 4 bits). The result is added by an adder 44 as a current counter value to PORT_X_FCH_BYTE (k bits). The sum is input to the D input terminal of a D-FF 45. When 16 bytes are fetched from the first fetching operation, the subtracter 43 is not required.

In the D-FF 45, when an FCH_REQUEST_PORT_X signal is L, the operation of the D-FF is inhibited. Otherwise, the input signal to the input terminal D is output as a counter value (value of PORT_X_FCH_BYTE (port_X_fetch_byte)) when the clock is input. When a CLEAR_PORT_X (clear_port_X) signal is input to the reset terminal, the counter value is reset.

Figure 6:
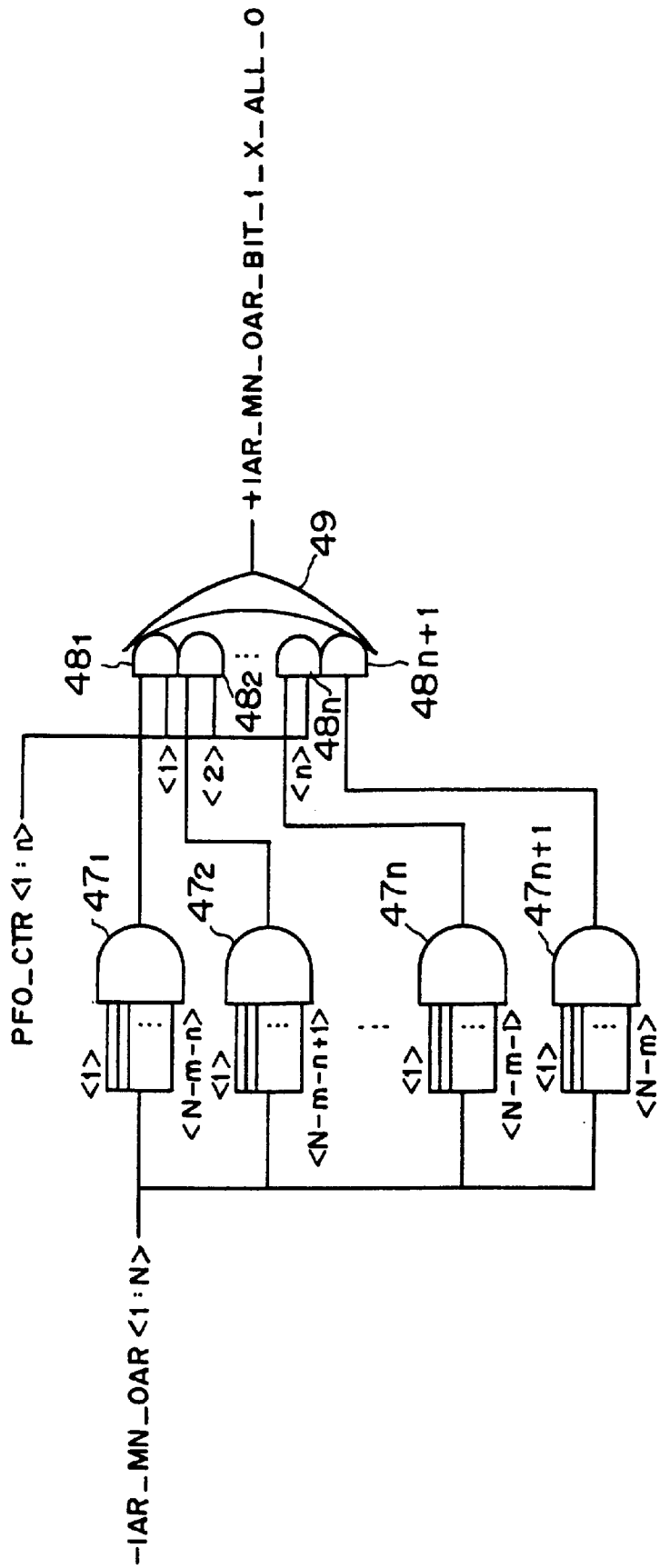
FIG. 6 is a block diagram showing an example of the configuration of the instruction overwrite possibility determination circuit using the output of the instruction fetch counter.

FIG. 6 shows an example of the configuration of the instruction overwrite possibility determination unit using the output of the instruction fetch counter. The circuit outputs IAR_MINUS (MN)_OAR_BIT_1_X_ALL_0 as a signal indicating that the right inequality indicating a possibility for the overwrite of an instruction exists.

In FIG. 6, higher bits of a bit inverted signal of the difference (N bits) between the IAR and the OAR are provided for n+1 AND gate $47_1$ through AND gate $47_{n+1}$. m indicates the length of an instruction sequence (number of instructions) fetched in one instruction fetching operation. As described above, assuming that a 16-byte instruction sequence is fetched in one fetching operation, m is 4. Therefore, an input of the lowest AND gate $47_{n+1}$ can be the higher N−m=N−4 bits excluding the lower 4 bits in the bit inversion result of the difference between the IAR and the OAR.

For example, in FIG. 4, when the count value of the instruction fetch counter PFO_CTR_X (prefetch order_counter_X) is 0, one instruction fetching operation is performed if the instruction fetch port is valid. Therefore, if the right inequality in the inequality (1), that is, the difference between the IAR and the OAR, determines a positive range, then it is determined that there is a possibility for the overwrite of an instruction when the difference is smaller than 16 (=F×0+S). However, it is assumed that the data length S written to the main storage as an execution result of a store instruction is a maximum of 16 bytes. Even if it is actually smaller than 16 bytes, it is assumed that 16-byte data is written. Therefore, when actual write data is short, there is a possibility for an erroneous determination.

When the difference between the IAR and the OAR is smaller than 16, the value is equal to or smaller than 15, that is, all 0 excluding the lower m=4 bits when the value is represented in binary. Therefore, in the inversion result, higher N−4 bits are all 1, the output of the AND gate $47_{n+1}$, the outputs of an AND gate $48_{n+1}$ and an OR gate 49 are H, and a signal indicating that the right inequality exists is output from the OR gate 49.

When the count value of the instruction fetch counter is 1, that is, the lowest bit (n-th bit) is 1, then two or less instruction fetching operations are performed, and it should be determined that the difference between the IAR and the OAR is smaller than 32 (=F×1+S). That is, all bits excluding the lower m+1=5 bits are 0 in binary. Therefore, an output of the AND gate $47_n$, an output of the AND gate $48_n$, and an output of the OR gate 49 are 1, thereby outputting a signal indicating that the right inequality exists.

When the count value of the instruction fetch counter is 2 or 3, four or less instruction fetching operations are performed, and it should be determined that the difference between the IAR and the OAR is smaller than 64 (F×3+S). That is, all bits excluding the lower m+2=6 bits are 0 in binary. An AND gate $47_{n−1}$ not shown in the drawings, that is, the outputs of the AND gates to which the higher N−m−2=N−6 bits are input in the inversion result of the difference between the IAR and the OAR are 1. The output of an AND gate $48_{n−1}$ to which the values of (n−1) bits in the n bits of the counter value are input, and the output of the OR gate 49 are 1, thereby outputting a signal indicating that the right inequality exists.

When the value of the instruction fetch counter is equal to or larger than 4, and equal to or smaller than 7, eight or less instruction fetching operations are performed, and it should be determined that the difference between the IAR and the OAR is smaller than 128 (=F×7+S). That is, all bits excluding the lower m+3=7 bits are 0 in binary, the output of the AND gate to which the bit inversion result other than the lower 7 bits not shown in the attached drawings is 1, and the output is selected by the value (=1) of the (n−2)th bit of the counter value, thereby outputting a signal indicating that the right inequality exists from the OR gate 49.

Figure 7:
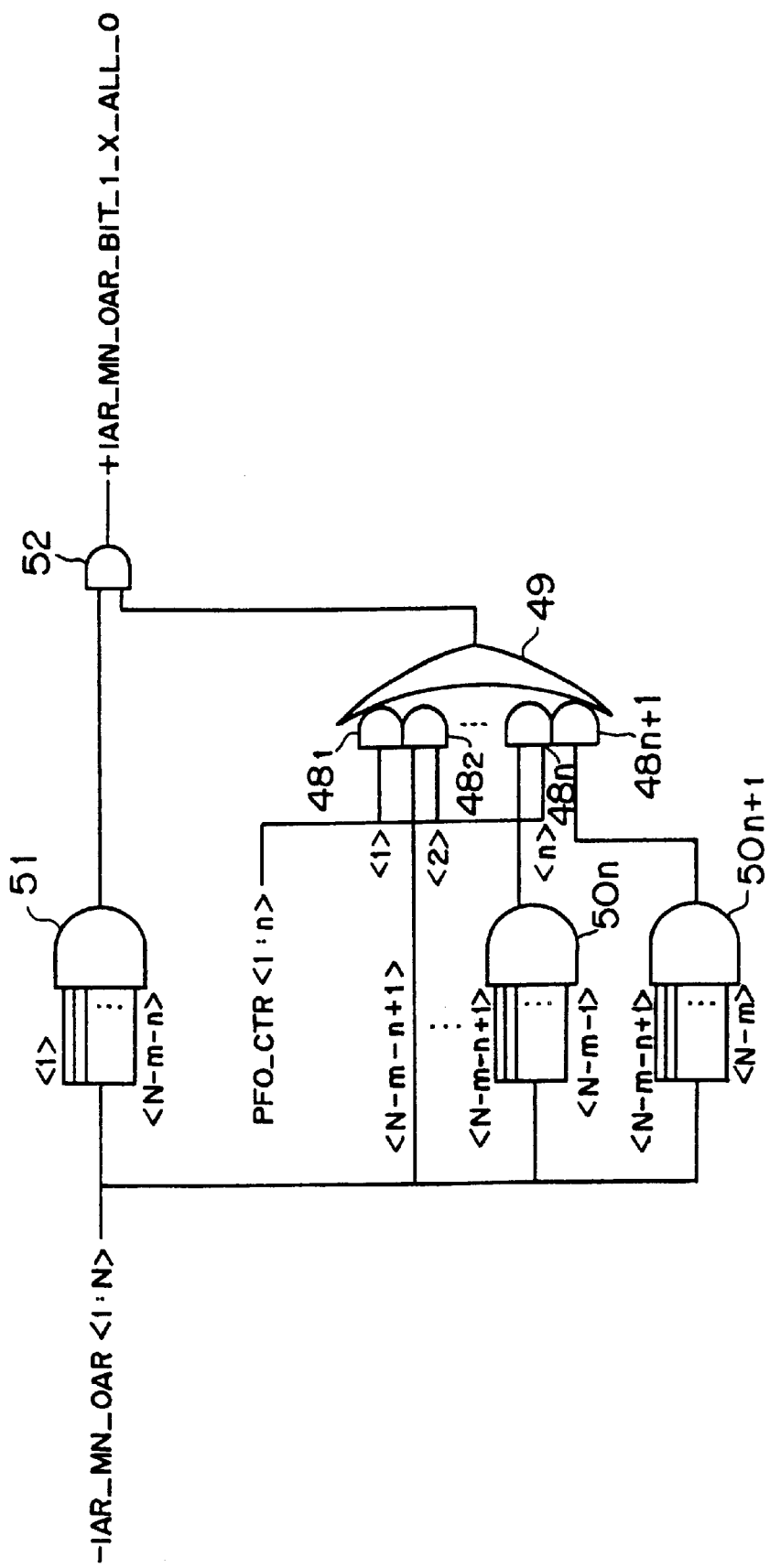
FIG. 7 shows a variation of the instruction overwrite possibility determination circuit shown in FIG. 6.

FIG. 7 shows a variation of the determination circuit shown in FIG. 6. In FIG. 7, in the values obtained by inverting the bits of the subtraction result between the IAR and the OAR, for example, the higher N−n−4 bits are isolated and provided only for an AND gate 51, the lower bits are output to the AND gate at the preceding stage of the AND/OR selector comprising AND gates $48_1$ through $48_{n+1}$, and an OR gate 49.

Higher (N−n−3)th bit through (N−4)th bit are input in the bit inversion result of the difference between the IAR and the OAR to, for example, an AND gate $50_{n+1}$, and the output of the AND gate $48_{n+1}$ and the OR gate 49 are 1 if the above described values are all 1. At this time, when the higher bits are all 1 and the output of the AND gate 51 is 1, an output of an AND gate 52, that is, the signal indicating the right inequality exists is output from the AND gate 52.

Similarly, an AND gate $50_n$ and the AND gate 51 perform the operations practically identical with those of the AND gate $47_n$ shown in FIG. 6, and the AND gate 52 outputs a signal indicating that the right inequality exists. Normally, a delay increases in proportion to the number of inputs to the gates, and higher bits are computed with delay in the operation of (IAR−OAR), thereby reducing the delay of a signal with the configuration shown in FIG. 7 as compared with the circuit shown in FIG. 6.

Figure 8:
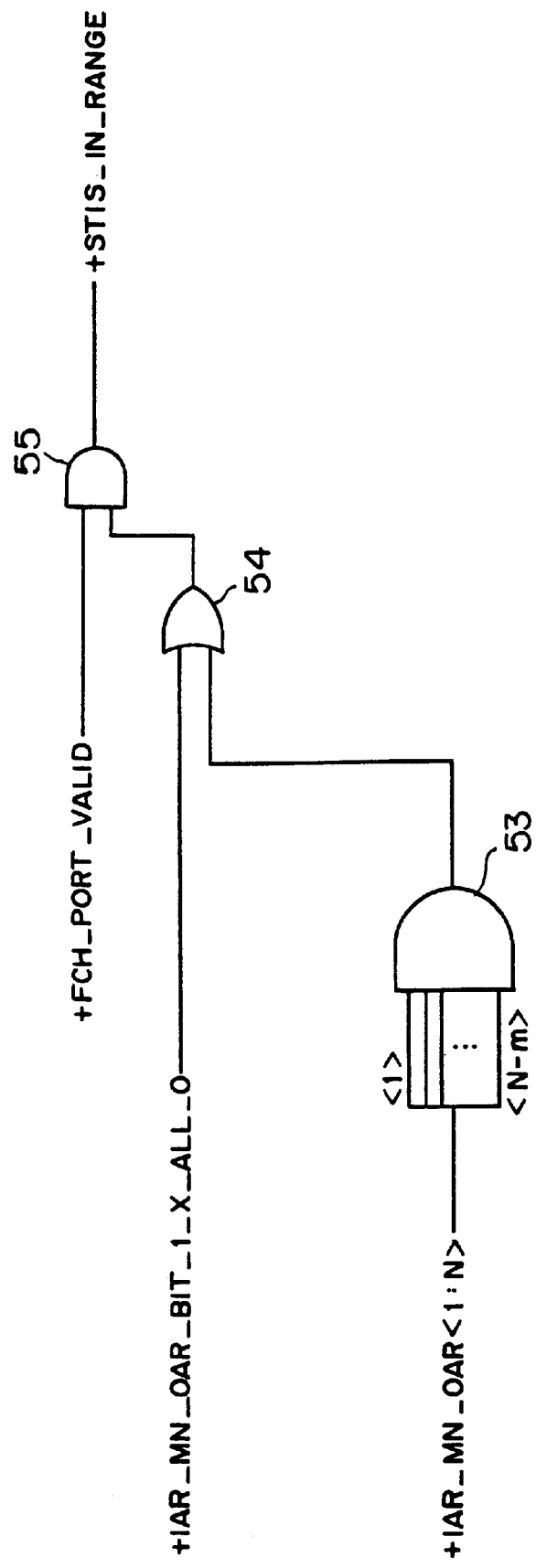
FIG. 8 shows an example of the configuration of the determination circuit for determining the validity of the entire inequality representing a possibility for the overwrite of an instruction using an output of the determination circuit shown in FIG. 6 or 7.

FIG. 8 shows the configuration of the circuit for outputting a store instruction stream (STIS) in range signal indicating that the entire inequality described above exists using the output of the determination circuit shown in FIG. 6 or 7.

In FIG. 8, the output of the circuit in FIG. 6 or 7, that is, the signal indicating that the right inequality exists, is input to one input terminal of an OR gate 54. The output of an AND gate 53 is input to the other input terminal of the OR gate 54. The difference between the IAR and the OAR, that is, the value of higher bits (N−4) is provided for the AND gate 53. The AND gate 53 determines the existence of the left inequality in the entire inequality described above, and detects that the values of all higher bits excluding the lower four bits are 1 to determine that IAR−OAR equals −F, that is, it is larger than −16, namely, IAR−OAR is negative, and the absolute value is equal to or smaller than 15.

The output of the OR gate 54 is 1, that is, the left inequality of the entire inequality described above, or the right inequality exists, and the output is input to an AND gate 55 together with an FCH_PORT_VALID (fetch_port_valid) signal indicating that the fetch port is valid, thereby outputting from the AND gate 55 an STIS_IN_RANGE (store instruction stream_in_range) signal indicating that there is a possibility for the overwrite of an instruction.

Figure 9:
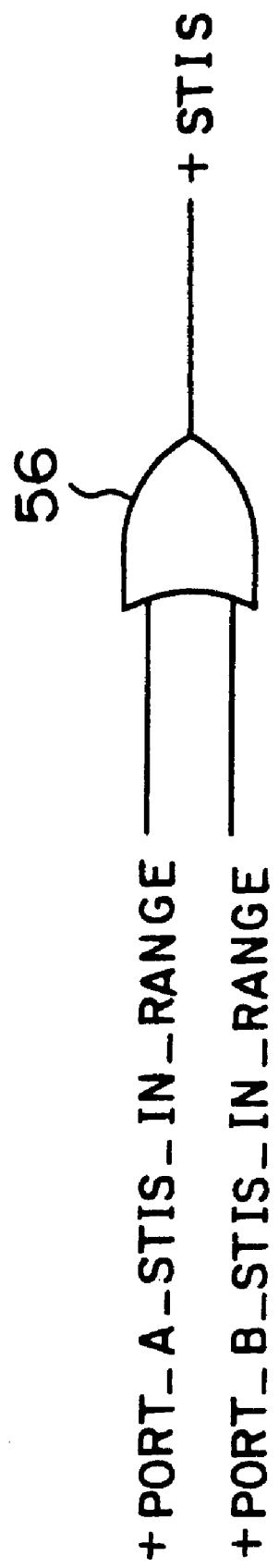
FIG. 9 shows the entire determination circuit for overwriting an instruction corresponding to the two instruction fetch ports A and B.

FIG. 9 shows the entire determination circuit for outputting a signal (STIS) indicating that there is a possibility for the overwrite of an instruction from among the STIS_IN_RANGE signals corresponding to the two instruction fetch ports A and B. An OR gate 56 outputs the signal STIS indicating that there is a possibility for the overwrite of an instruction when the signal indicating that there is a possibility for the overwrite of an instruction is input corresponding to the port A or B.

Figure 10:
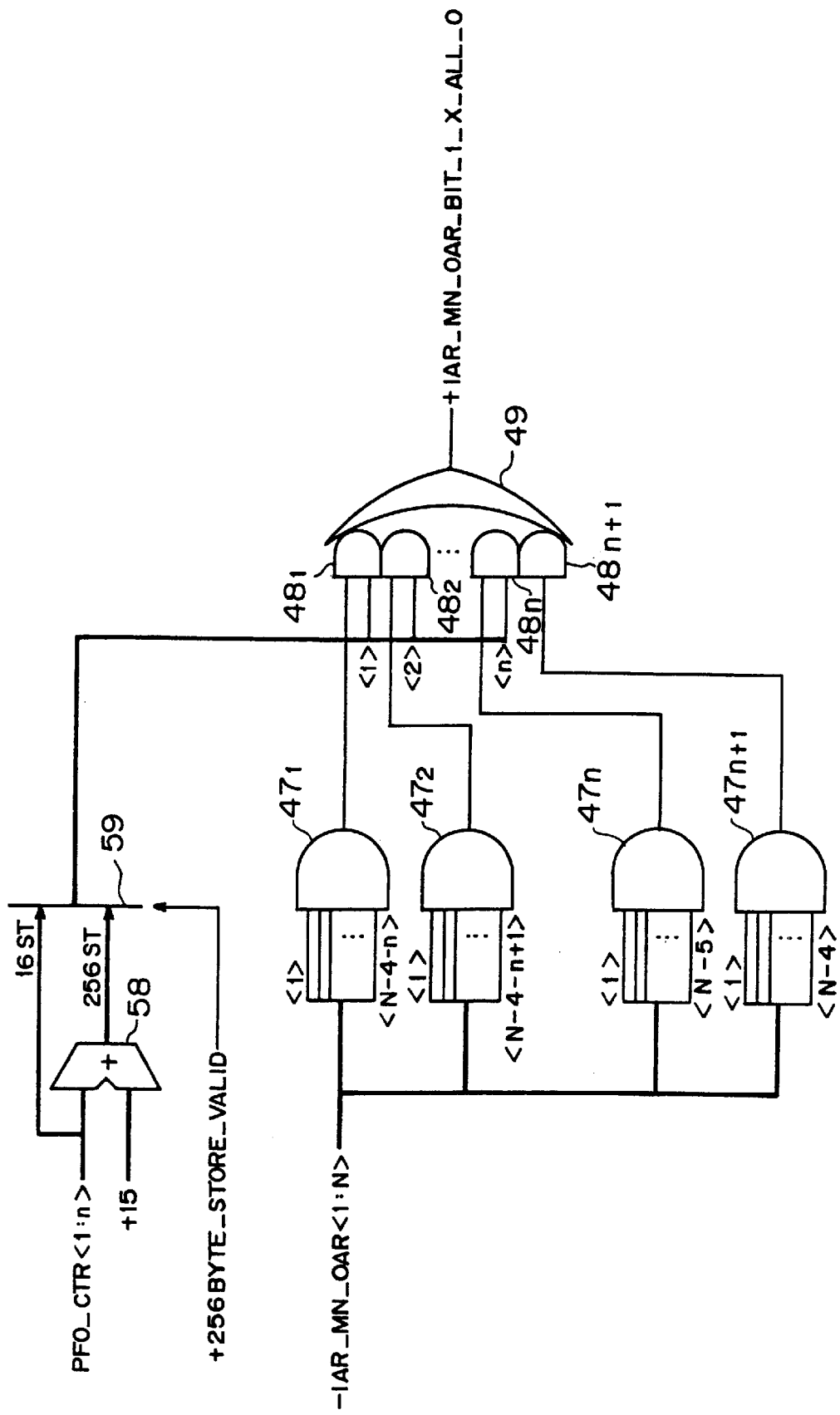
FIG. 10 shows a variation of the determination circuit shown in FIG. 6.

FIG. 10 shows the configuration of a variation of the determination circuit indicating the existence of the right inequality shown in FIG. 6. As described above, in FIG. 6, the length of data to be written to the main storage device as an execution result of a store instruction is fixed to 16 bytes. However, FIG. 10 shows an example of the configuration of the determination circuit when the data length is either equal to or smaller than 16 bytes, or equal to 256 bytes. When the data length is equal to or smaller than 16 bytes, a selector 59 uses the n output bits of the instruction fetch counter as with the case shown in FIG. 6, and the same operations as the case shown in FIG. 6 are performed.

On the other hand, when 256 bytes are stored, a BYTE_STORE_VALID signal becomes H, the selector 59 selects the output of the addition circuit 58, and the selected output is used in controlling the selection by an AND/OR selector. An addition circuit 58 adds 15 to an n-bit value of the instruction fetch counter. When the data length of the data written to the main storage device is S=256, and when the number of bytes fetched in one fetching operation is F=16 bytes, the above described inequality (1) is represented as follows.

$$-F < IAR - OAR < 16 \times (n+15)$$

The value obtained by adding 15 to the value of the instruction fetch counter can be used as a selection control signal of the AND/OR selector. When the length of data to be stored is a value other than 256 bytes, it can be determined whether or not there is a possibility for the overwrite of an instruction by similarly adding a corresponding value to the value of the instruction fetch counter.

Figure 11:
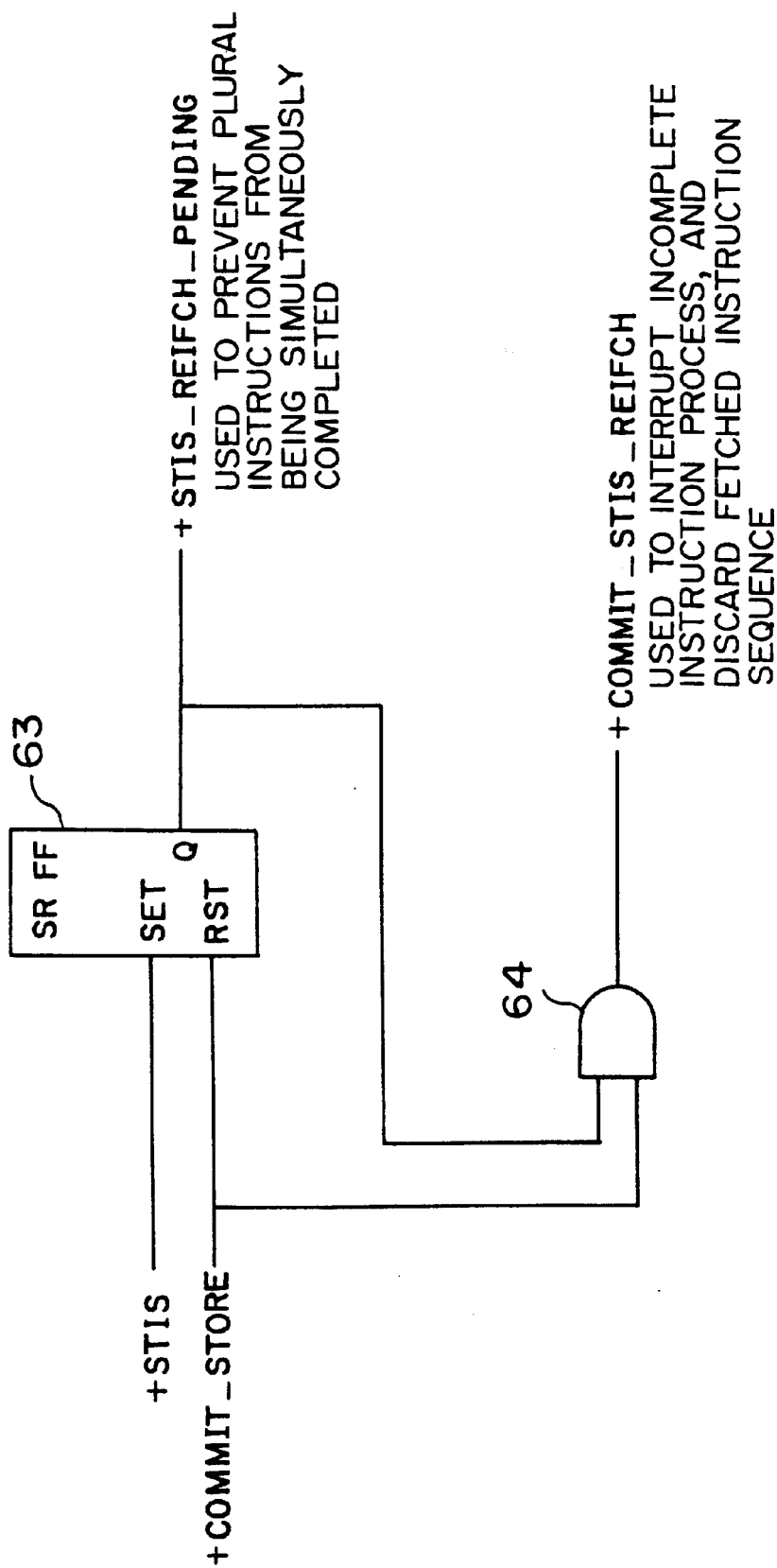
FIG. 11 shows a block diagram of the configuration of the subsequent instruction control circuit for appropriately controlling subsequent instructions when an instruction overwrite possibility is detected.

Described below is the control of a subsequent instruction when a possibility for the overwrite of a subsequent instruction by a store instruction is detected. FIG. 11 is a block diagram of the configuration of the subsequent instruction control circuit for preventing a plurality of instructions from being simultaneously completed, that is, for completing the instructions one by one after the STIS signal indicating a possibility for the overwrite of a subsequent instruction have been output from the OR gate 56 shown in FIG. 9 until a COMMIT_STORE (commit_store) signal (same as the instruction completion report signal (10) shown in FIG. 2) indicating that the corresponding store instruction has been completed is input, and for interrupting the process of an incomplete instruction whose execution has already been started so that an instruction sequence fetched to the instruction buffer can be discarded when the COMMIT_STORE (commit_store) signal is input. This circuit is provided in the instruction execution completing unit 20 shown in FIG. 2.

In FIG. 11, A set/reset flipflop 63 is set when the STIS signal is input, and a signal used as its output Q to prevent a plurality of instructions from being simultaneously completed, that is, an STIS_REIFCH_PENDING (STIS_ instruction refetch_pending) signal, is output. When the COMMIT_STORE signal is input to the reset terminal, the output Q is reset, and an AND gate 64 outputs a signal for use in interrupting an instruction whose execution has not been completed and in discarding an already fetched instruction sequence, that is, a COMMIT_STIS_REIFCH (commit_STIS_instruction refetch) signal.

Described below is the reason for preventing instruction from being simultaneously completed from the point when it is determined that there is a possibility for the overwrite of an instruction by a store instruction until the store instruction is completed. As described above, the superscalar system is used in the embodiment of the present invention, and, for example, three instructions can be simultaneously completed. In the out-of-order system, the execution of any executable instruction can be started regardless of the execution order of instructions. However, an instruction should be completed in order, and it is necessary to complete instructions in the order they have been executed.

Therefore, for example, a commit stack entry (CSE) is used as a reservation station for control of a wait. The CSE is an entry for each instruction, and the start and the end of an instruction can be controlled for each entry.

Thus, it is not recognized that an instruction has been executed until the execution of the instruction has been completed. An instruction whose execution has not been completed is not logically recognized as an executed instruction. To complete the execution of a store instruction which can possibly overwrite a subsequent instruction, it is necessary to complete the execution of all instruction sequences subsequent to the store instruction. Otherwise, it is necessary to complete the instruction sequences on the same cycle as the store instruction.

It is necessary to determine whether or not there is a possibility for the overwrite of a subsequent instruction before the completion of the W cycle of a store instruction because there is a possibility that the subsequent instruction can be completed at the same timing as the W cycle of the store instruction.

A problem arises when a store instruction is completed simultaneously with one or two subsequent instructions. If there is a possibility for the overwrite of an instruction completed simultaneously with the store instruction, then there is a possibility that the simultaneously completed instruction is erroneously executed. Therefore, when a store instruction with which there is a possibility for the overwrite of a subsequent instruction is detected, the system has control such that instructions can be executed one by one until the store instruction is completed according to the embodiment of the present invention, thereby successfully avoiding the simultaneously completion of the store instruction with any of the subsequent instructions.

In the superscalar system, the largest possible number of instructions which can be normally completed are designed to be completed without limit. Therefore, it is not common to selectively complete some of the instructions which can be immediately completed. Accordingly, in FIG. 11, a plurality of instructions are not simultaneously completed, but they are completed one by one, thereby realizing a rather simple control circuit to control a store instruction which can rewrite its subsequent instructions until the store instruction is completed.

Figure 12:
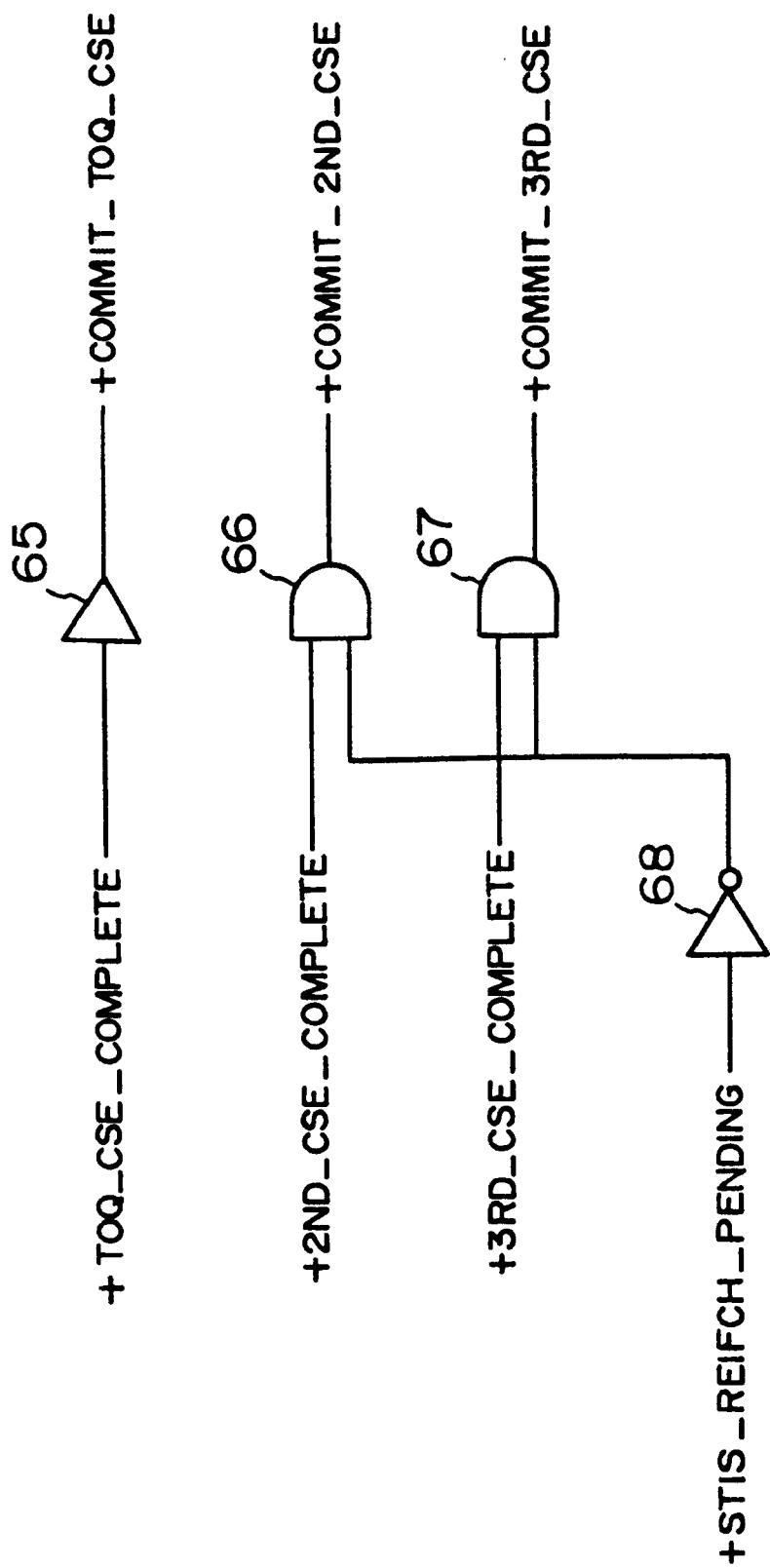
FIG. 12 is a block diagram of the configuration of the instruction completion control circuit for completing one instruction at a time.

FIG. 12 shows the configuration of the control circuit for suppressing the simultaneous completion of a plurality of instructions as shown in FIG. 11. The circuit is also provided in the instruction execution completing unit 20. As described above, three instructions can be simultaneously completed according to the embodiments of the present invention. The three instructions correspond to the three entries of the above described commit stack entry (CSE), that is, the top, second, and third entries. The top entry corresponds to the oldest instruction (to be first completed) in the execution order, and the third entry corresponds to the newest instruction (to be last completed) in the execution order.

Corresponding to these three entries, signals indicating the completion of an instruction is input from the CSE as a complete signal to the set/reset flipflop 63 for the top entry, and to one input terminal of AND gates 66 and 67 for the second and third entries respectively.

A buffer 65 and the AND gates 66 and 67 output a commit signal provided for a register management unit, memory, cache, etc. for designation of a completion process for an instruction corresponding to each entry such as a process of writing an execution result to a register, a process of writing to memory, etc. The output nullifies the corresponding entry of the CSE, and is used to move the pointer to the CSE (pointer to the top entry) to the entry corresponding to an instruction to be next completed.

The output of the SR-FF 63 shown in FIG. 11, that is, a STIS_REIFCH_PENDING signal, is inverted by an inverter 68 and is provided for one input terminal of each of the two AND gates 66 and 67. Therefore, when the output Q of the SR-FF 63 is H, the AND gates 66 and 67 do not output commit signals corresponding to the second and third entries of the CSE, and the operation of completing an instruction relevant to the corresponding entry is not performed, thereby setting the instruction in a completion awaiting state.

Figure 13:
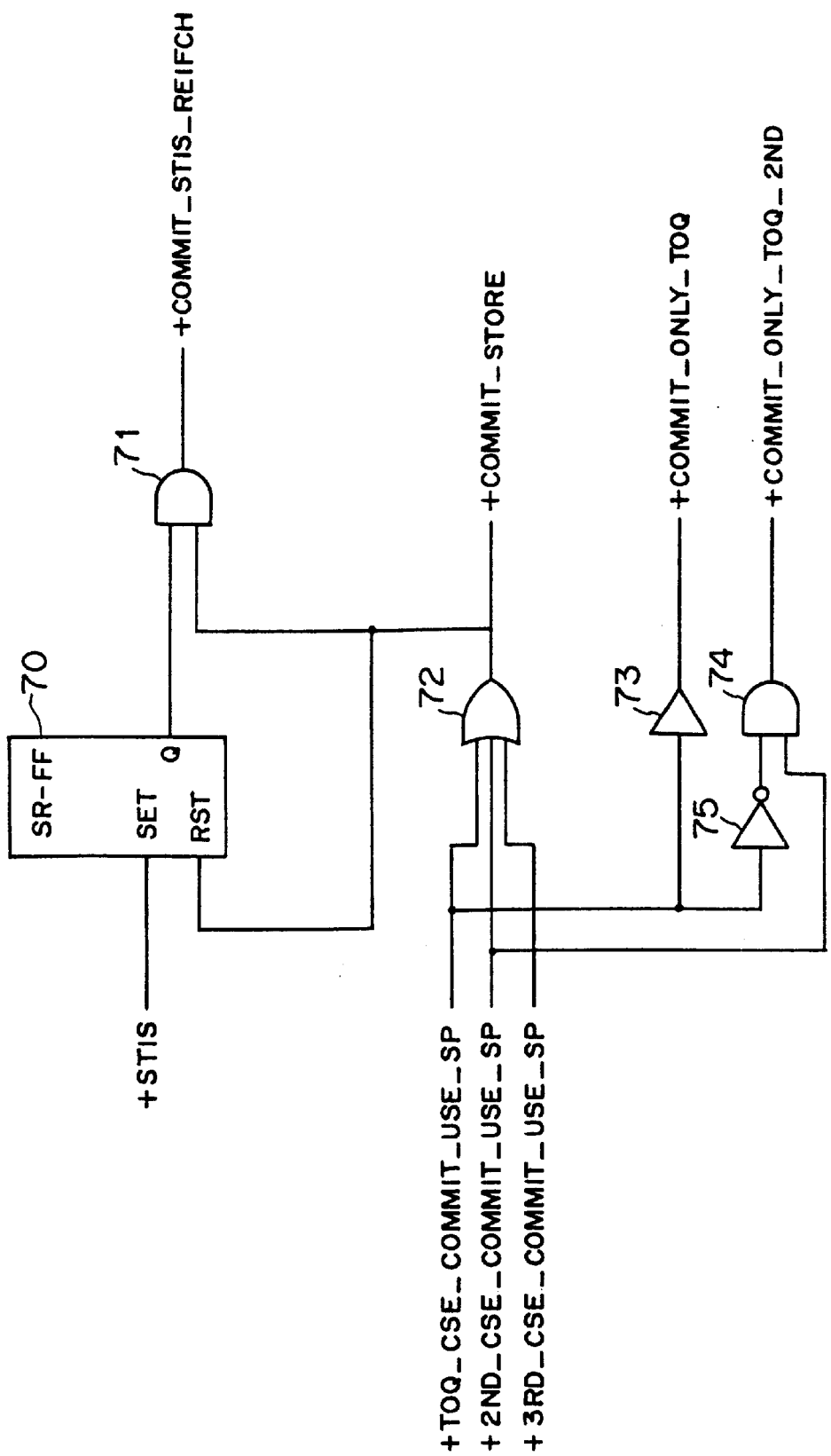
FIG. 13 is a block diagram 1 showing another example of the configuration the subsequent instruction control circuit.
Figure 14:
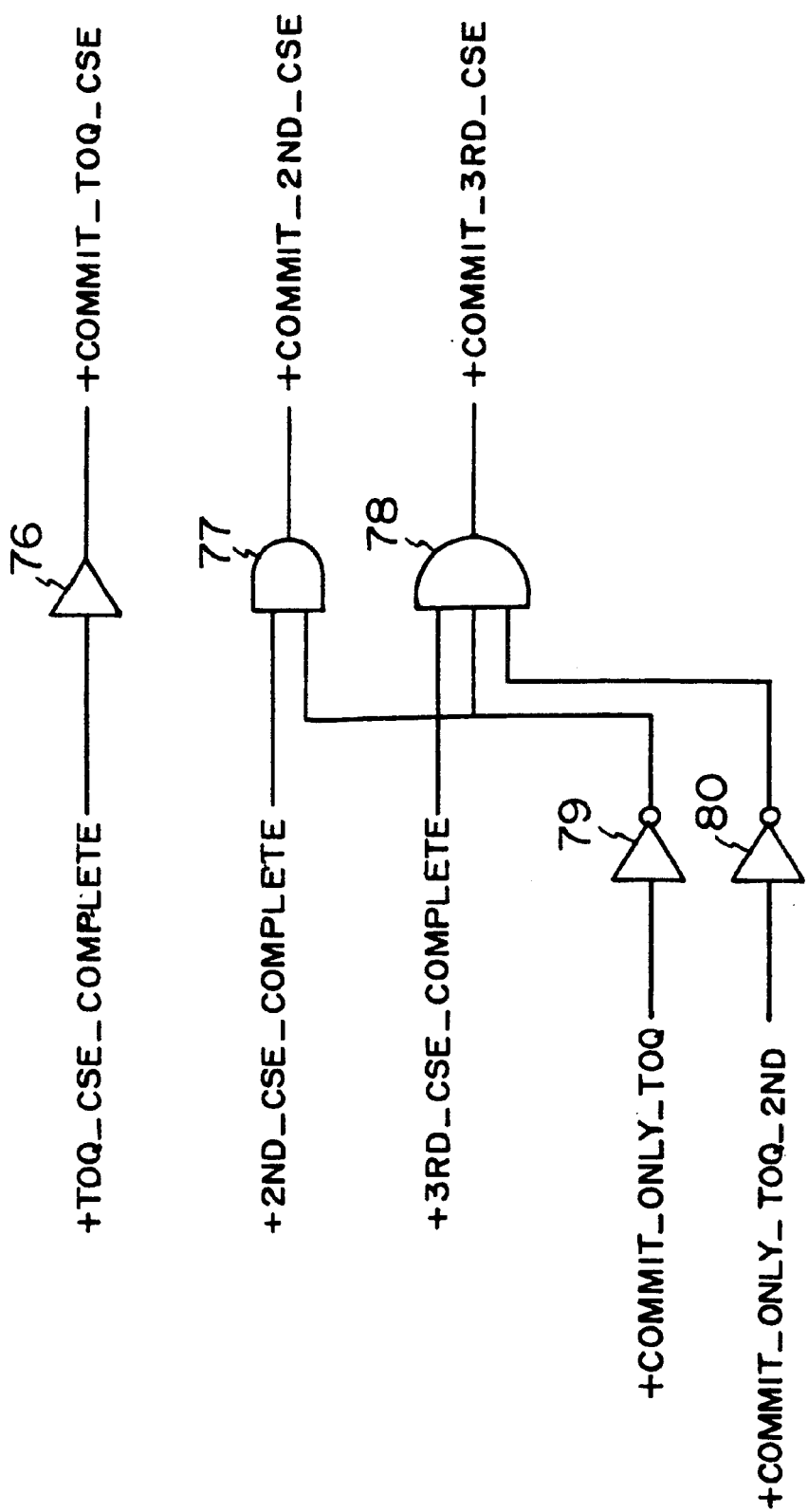
FIG. 14 is a block diagram 2 showing a further example of the configuration the subsequent instruction control circuit.

FIGS. 13 and 14 show the configurations of the control circuits for controlling an instruction subsequent to a store instruction in a different manner from FIGS. 11 and 12 from the point when a possibility for the overwrite of the instruction subsequent to the store instruction is detected until the execution of the store instruction is completed. These circuits are provided in the instruction execution completing unit 20. In FIGS. 13 and 14, a plurality of instruction are simultaneously completed if a store instruction is not contained in the instructions to be simultaneously completed, and the instructions up to the store instruction can be simultaneously completed from the point when a possibility for the overwrite of the instruction subsequent to the store instruction is detected until the execution of the store instruction is completed.

In FIG. 13, an SR-FF 70 is set when the STIS signal is input as with the FF 63 shown in FIG. 11, and output Q is H. Then, it is set in a reset wait state (reset at the next clock) when the COMMIT_STORE signal is input as an output of an OR gate 72, and the same COMMIT_STIS_REIFCH signal as the output of the AND gate 64 shown in FIG. 11 is output from an AND gate 71.

A signal indicating that an execution completion signal corresponding to the three entries uses a store port, that is, a signal indicating that a corresponding instruction is a store instruction, is input to the OR gate 72. If any of the instructions corresponding to the three entries is a store instruction, then a COMMIT_STORE signal is output from the OR gate 72. On the other hand, a COMMIT_USE_SP (commit_use_store port) signal corresponding to the top entry is provided for a buffer 73. As an output of the buffer 73, a COMMIT_ONLY signal indicating that only an instruction corresponding to the top entry is output. This output is used to perform an execution completing process only on the instruction corresponding to the top entry as described by referring to FIG. 14.

On the other hand, the output of an AND gate 74 is a COMMIT_ONLY signal for use in completing the execution of an instruction corresponding only to the two entries, top and second entries. The output indicates H when the COMMIT_USE_SP signal corresponding to the top entry is L, the output of an inverter 75 is H, and the COMMIT_USE_SP signal corresponding to the second entry is H. That is, the instruction corresponding to the second entry is a store instruction, and two instructions corresponding to the top and second entries can be simultaneously completed.

On the other hand, when all COMMIT_USE_SP signals corresponding to the three entries are L, then the outputs of the OR gate 72 and the AND gate 71 are L, and special control of the completion of subsequent instructions is not required, thereby simultaneously completing the three instructions.

FIG. 14 shows the control circuit for controlling the actual completion of the execution of an instruction using the output shown in FIG. 13. A buffer 76, and AND gates 77 and 78 perform the same operations as the buffer 65, and the AND gates 66 and 67 shown in FIG. 12. The AND gate 77 outputs a commit signal for the actual completion of the execution of an instruction corresponding to the second entry when the output of N inverter 79 is H, that is, the output of the buffer 73 shown in FIG. 13 is L, and the COMMIT_USE_SP signal corresponding to the top entry is L.

The AND gate 78 outputs a commit signal for the actual completion of the execution of an instruction corresponding to the third entry when the output of an inverter 80 is H, that is, the output of the AND gate 74 shown in FIG. 13 is L.

Thus, when the instruction corresponding to the top entry in the three entries is a store instruction, the store instruction is completely executed. When the instruction corresponding to the second entry is a store instruction, the instructions corresponding to the two entries, that is, the top and the second entries are completely executed. In addition, when the instruction corresponding to the third entry is a store instruction, the execution of the three instructions is simultaneously completed as in the normal operation, and a COMMIT_STORE signal as an output of the OR gate 72 shown in FIG. 13 is H in any case.

Figure 15:
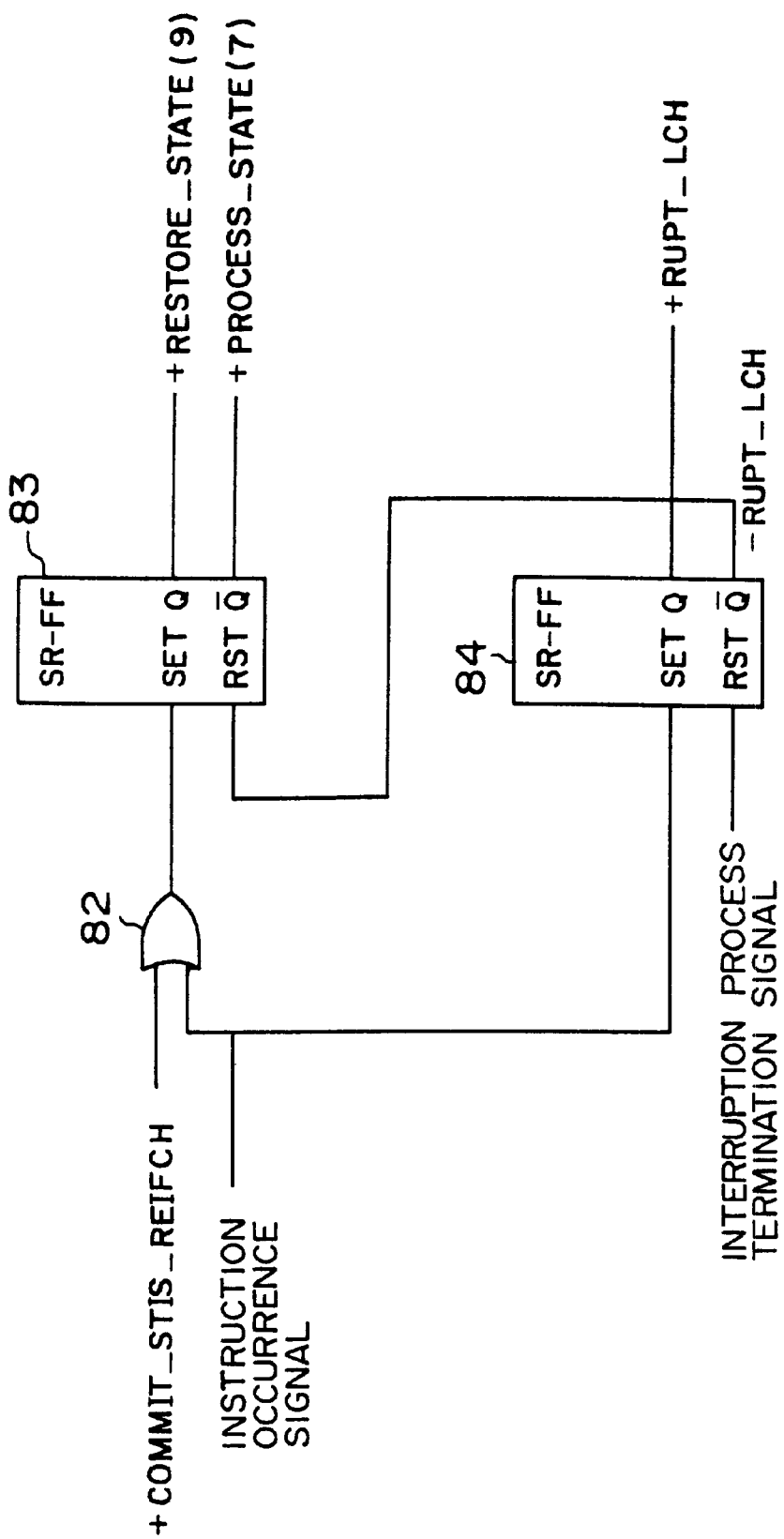
FIG. 15 is a block diagram 1 of the configuration of the process interruption and instruction discard control circuit.
Figure 16:
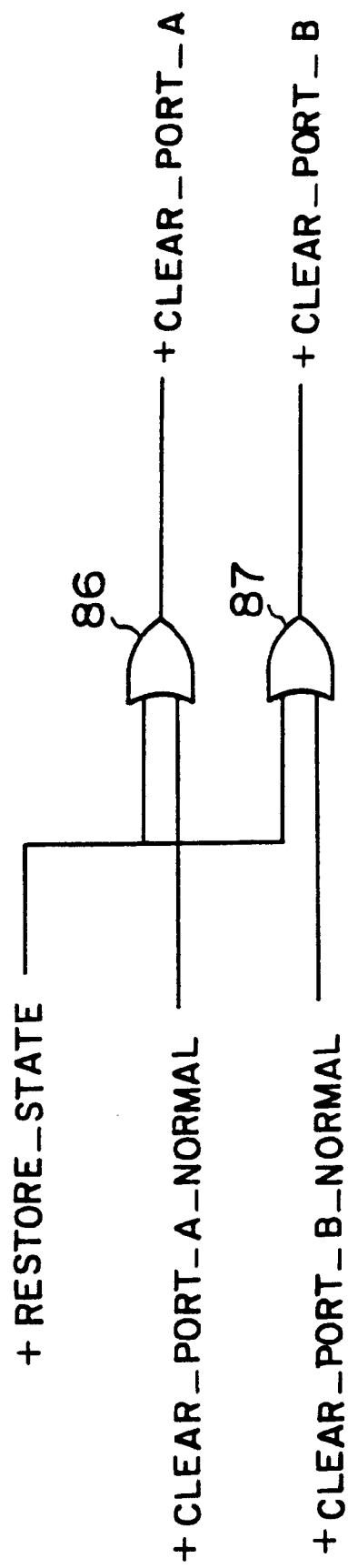
FIG. 16 is a block diagram 2 of the configuration of the process interruption and instruction discard control circuit.

FIGS. 15 and 16 show the configurations of the process interruption and instruction discard control circuits for interrupting the process of a subsequent instruction whose execution has not been completed, and for discarding an already fetched subsequent instruction.

The circuit shown in FIG. 15 is provided in the interruption process control unit 21 shown in FIG. 2. The circuit shown in FIG. 16 is provided in the instruction fetch unit 31.

In FIG. 15, if the output of the AND gate 64 is provided for one input terminal of an OR gate 82, an SR-FF 83 is set, and its output Q, that is, a RESTORE_STATE (restore_state) signal (9) becomes H. The RESTORE_STATE signal performs a controlling operation like the common interrupting process to interrupt the process on an instruction subsequent to an instruction whose execution has just been completed.

The RESTORE_STATE signal is provided for one input terminal of each of the two OR gates 86 and 87 shown in FIG. 16. As in the case where a CLEAR_PORT_NORMAL signal provided for the other input terminal is H, CLEAR_PORT signals corresponding to the two instruction fetch ports A and B are output. The CLEAR_PORT signals are used to discard already fetched subsequent instructions corresponding to the respective instruction fetch ports.

The CLEAR_PORT_NORMAL signal provided for one input terminal of each of the two OR gates 86 and 87 is output when it is determined that a branch prediction is made by a branch instruction process unit not shown in FIG. 2, and when an already fetched instruction becomes unnecessary. Otherwise, the signal is used to clear the instructions fetched corresponding to all instruction fetch ports so that an instruction can be refetched when the branch prediction fails.

In addition, the CLEAR_PORT signal as an output of each of the OR gates 86 and 87 is used only to discard an already fetched instruction and to clear the instruction fetch counter. In this example, it is provided in the instruction fetch unit. However, it can also be provided in the instruction execution completing unit.

In FIG. 15, the SR-FF 83 is set when the output of the AND gate 64 shown in FIG. 11 becomes H as described above. However, assuming that a common interruption generation signal has not been output, the inverted output $\overline{Q}$ of an SR-FF 84 is H, and H is simultaneously input to the set terminal and the reset terminal of the SR-FF 83. The SR-FF 83 prioritizes 'set' when H is simultaneously input to the set terminal and the reset terminal. As a result, the RESTORE_STATE signal is output. However, since the SR-FF 63 is reset at the clock immediately after the input of the COMMIT_STORE signal, the output of the AND gate 64 shown in FIG. 11 is H for a short time, and during the period, the RESTORE_STATE signal is output from the SR-FF 83.

Furthermore, in FIG. 15, when an interruption occurrence signal is input to the OR gate 82 as a common interruption process, the SR-FF 83 is reset, and the restore state signal is output. The interruption occurrence signal is also used to set the SR-FF 84, and a RUPT_LCH (interrupt_latch) signal indicating an interrupting process being performed is output. Then, the SR-FF 84 is reset when an interrupting process termination signal is input.

Described below is another embodiment of the present invention. In the above described embodiment, when an inequality for determination of a possibility for the overwrite of an instruction subsequent to a store instruction, that is, the inequality (1), is discriminated, a circuit for individually discriminating the right inequality and the left inequality, that is, the case where IAR−OAR is positive and the case where it is negative, is used. However, the embodiment described below uses a multiple input adder for determination of one inequality.

In FIG. 3, the address of an instruction last fetched in the instructions fetched in five instruction fetching operation is not stored as the position of the IAR, but the address of the instruction subsequent to the instruction fetched in n instruction fetching operations is stored as the latest address at which a fetch request is issued at the IA stage. In addition, according to the present embodiment, it is not necessary to fix the length of an instruction sequence fetched at each fetch request. According to the present invention, the number of bytes of instructions fetched at each instruction fetch request can be accumulated. Assuming that the number of fetched bytes accumulated by the counter is L, the discrimination inequality is represented as follows.

$$0<IAR-OAR<L+S$$

Otherwise, when the counter shown in FIG. 4 is used, the discrimination inequality is represented as follows.

$$0<IAR-OAR<(F\times n)+S$$

As shown in FIG. 3, the above described inequality is transformed as follows when the position of the IAR is stored as represented by the above described inequality, and is used in determining whether or not there is a possibility for the overwrite of an instruction.

$$0<IAR-OAR \text{ and } 0<OAR-IAR+L+S \quad (2)$$

or $$0<IAR-OAR \text{ and } 0<OAR-IAR+(F\times n)+S \quad (3)$$

When the IAR refers to the last address of the instructions fetched in n instruction fetching operations as described above, and when the lengths of instruction sequences for each instruction fetching operation are not fixed, the discrimination inequality is represented as follows with the maximum value of an instruction length for each fetching operation defined as M, and the number of accumulated fetched bytes defined as L.

$$-M<IAR-OAR<L+S$$

Figure 17:
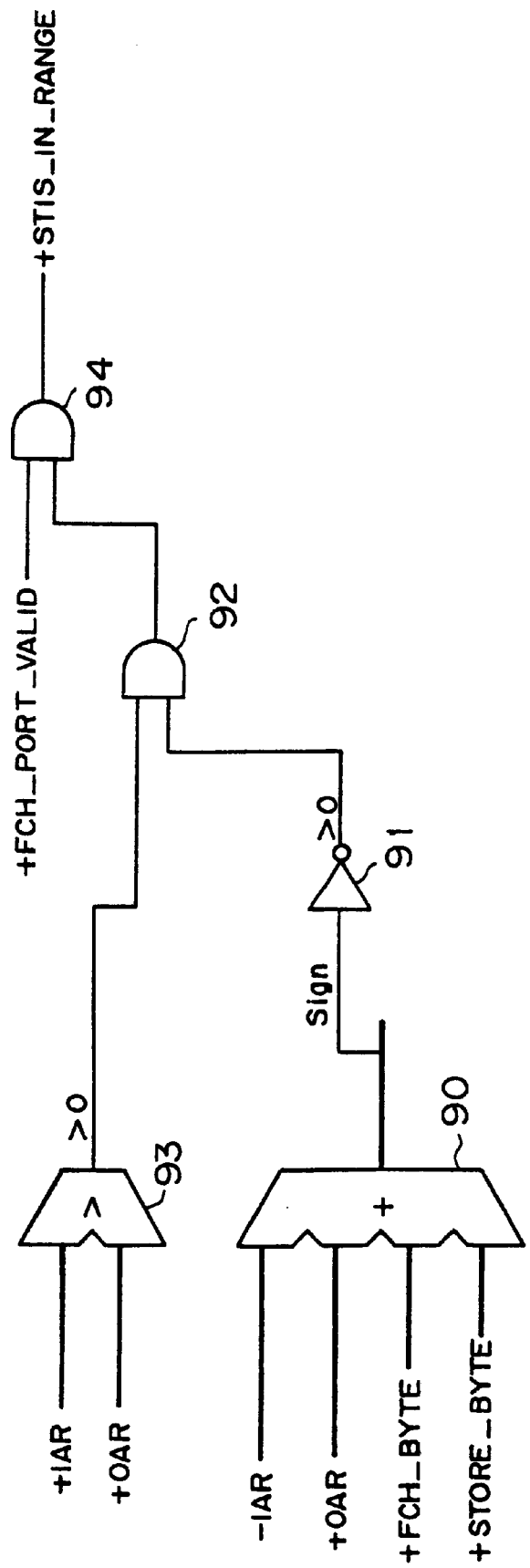
FIG. 17 is a block diagram showing another example of the configuration of the overwrite possibility determination circuit.

FIG. 17 is a block diagram of the configuration of the instruction overwrite possibility determination circuit for evaluating the inequality (2) or (3). In FIG. 17, a 4-input adder 90 is used to evaluate the latter inequality in the inequality (2) or (3). An input to the 4-input adder can be the bit inversion result of the address of the instruction subsequent to the instructions fetched in n instruction fetching operations—IAR, the operand address OAR at which the data of an instruction execution result by a store instruction is stored, the number of bytes of already fetched instructions FCH_BYTE (fetch_byte, F×n), and the data length STORE_BYTE (store_byte, S) stored as an execution result of a store instruction.

Since, for example, the phase is inverted in the operation result of the 4-input adder 90, the result is negative when the inequality (2) exists, and the sign is inverted by an inverter 91, and is input to one input terminal of an AND gate 92. On the other hand, an output of a comparator 93 is input to the other input terminal of the AND gate 92. The comparator 93 evaluates the former inequality in the inequality (2) or (3), that is, compares the IAR with the OAR. When the IAR is larger than the OAR, H is output as a comparison result. As a result, an output of the AND gate 92 is H, and is input to an AND gate 94. A FCH_PORT_VALID (fetch_port_valid) signal for which a fetch port is effective is input to the AND gate 94. When a fetch port is effective, the STIS_IN_RANGE (STIS_in_range) signal indicating that there is a possibility for the overwrite of an instruction corresponding to the fetch port is output from the AND gate 94 as with the output of the AND gate 55 shown in FIG. 8.

According to the embodiment of the present invention, erroneous discrimination can be suppressed in principle by using, for example, a 4-input adder, thereby correctly determining whether or not there is a possibility for the overwrite of an instruction. However, especially when the out-of-order system is adopted, a corresponding store instruction can be completed unexpectedly quickly, and the time required for a correct computation using a multiple input adder may not be reserved.

In the out-of-order system, a writing operation using a store instruction can be performed when data to be written is prepared. There is no sufficient interval between the cycle A for address computation and the cycle X for confirmation of the preparation of store data, and therefore, the determination as to whether or not there is a possibility for the overwrite of an instruction should be completed in the shortest time of 2 clocks. In consideration of the limit on 1-clock process at a latest clock cycle shortening request, a further quicker operation circuit is required.

In such a case, to suppress a signal delay, it is necessary to use a certain simple circuit. Therefore, a quick computation can be performed for correct discrimination by combination use of a 2-input adder and a simple operations circuit instead of a multiple input adder. A simple operations circuit can be used because, for example, an output of an instruction fetch counter according to the above described inequality (2) or (3), that is, the largest possible value of the length (L) or (F×n) of a fetched instruction sequence or the length (S) of data stored by a store instruction is much smaller (half or less in number of digits) than the range of the instruction address IAR and the storage target address OAR, that is, the address space.

Figure 18:
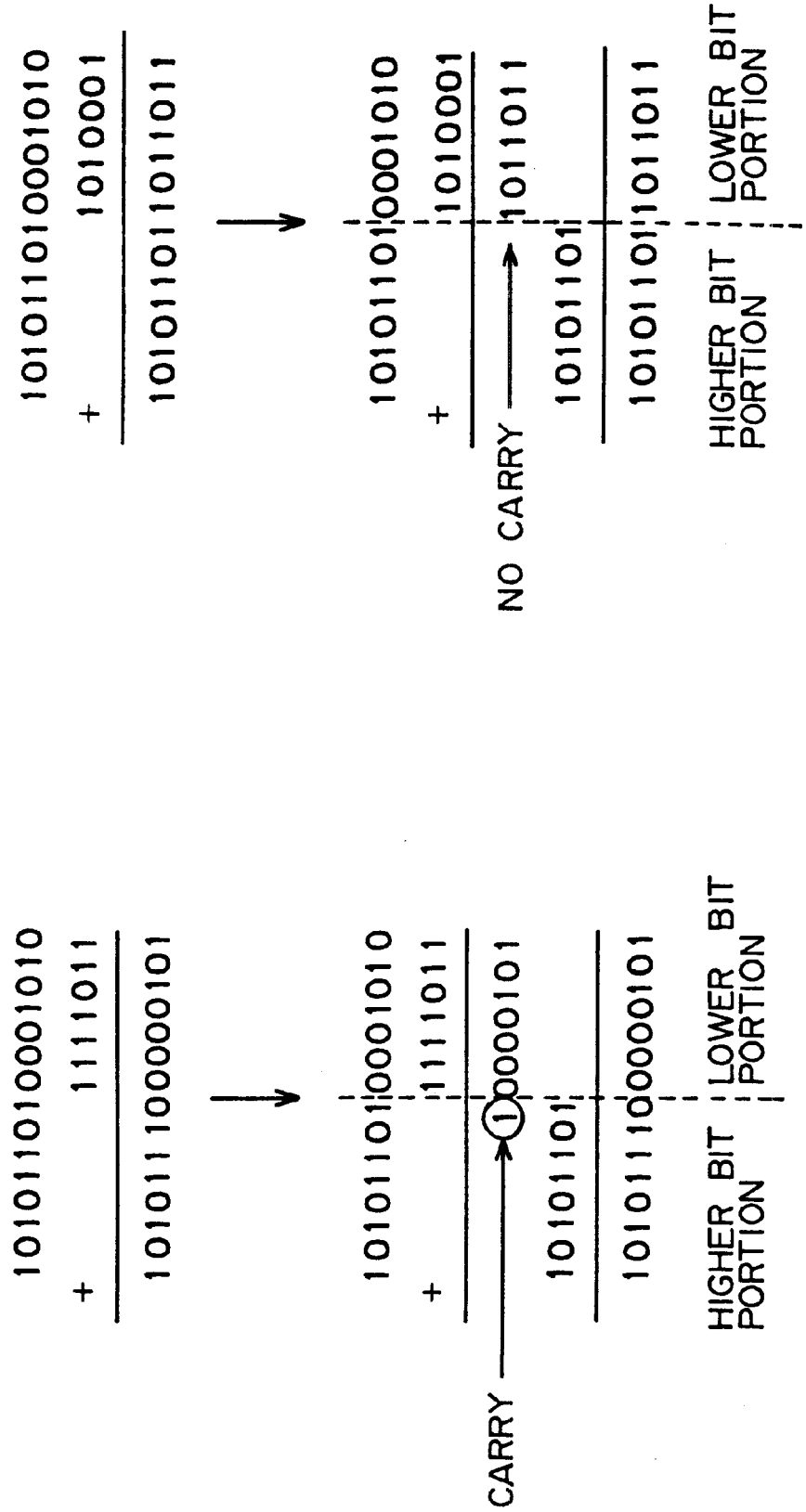
FIGS. 18A and 18B show examples of operations in which the absolute value of one of the two values to be processed is small.

Normally, in a multiple bit adder/subtracter circuit, a carry prediction circuit and a carry transmission circuit are used in combination. The carry transmission circuit includes a carry chain, thereby requiring a long time in computing higher bits when there arises a carry. However, when one of the values to be computed is small, there rarely arises a carry in a higher bit as shown in FIGS. 18A and 18B. As shown in FIG. 18A, it arises only when a carry (transfer in digits) arises as an operation result in a lower bit. At this time, 1 is added to a higher bit. On the other hand, as shown in FIG. 18B, when there arises no carry (transfer in digits) as an operation result in a lower bit, no operations are required for higher bits in principle.

Figure 19:
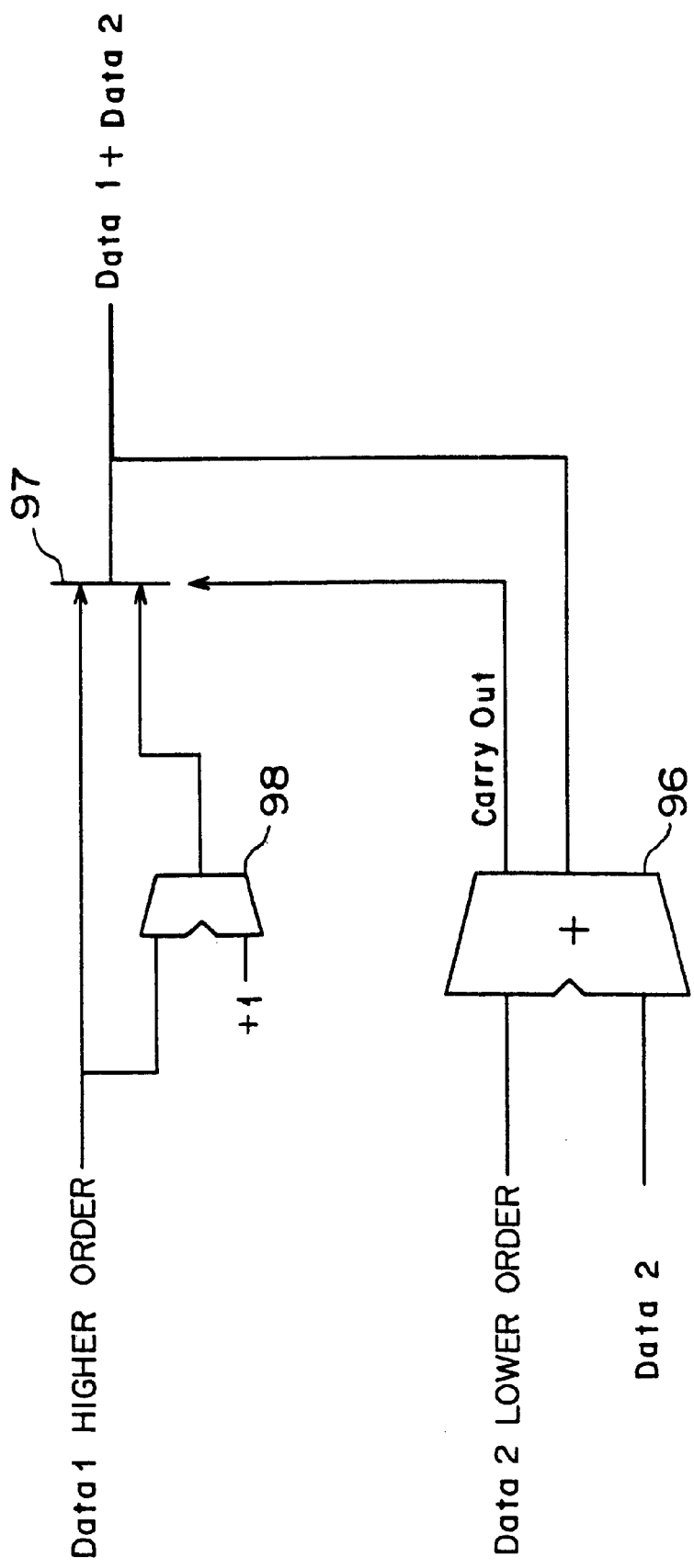
FIG. 19 shows an example of the configuration of the addition circuit when there is a difference in number of digits between the two values to be processed in the operations.

FIG. 19 shows an example of the configuration of the addition circuit when there is a difference in number of digits between two values to be computed. In this example, it is assumed that data 1 is much larger than data 2, and it is necessary to add the lower portion of the data 1 to the data 2.

In FIG. 19, an adder 96 adds the lower portion of the data 1 to the data 1, outputs the addition result, and outputs a carry output as a selection control signal for a selector 97. The selector 97 outputs the higher signal of the data 1 as is when no carry output exists. If there is a carry output, an incrementer 98 outputs an addition result by adding 1 to the higher portion of the data 1. The higher portion as an output of the 97 is added to the lower portion as an output of the adder 96 to obtain an addition result of the data 1 and 2.

Figure 20:
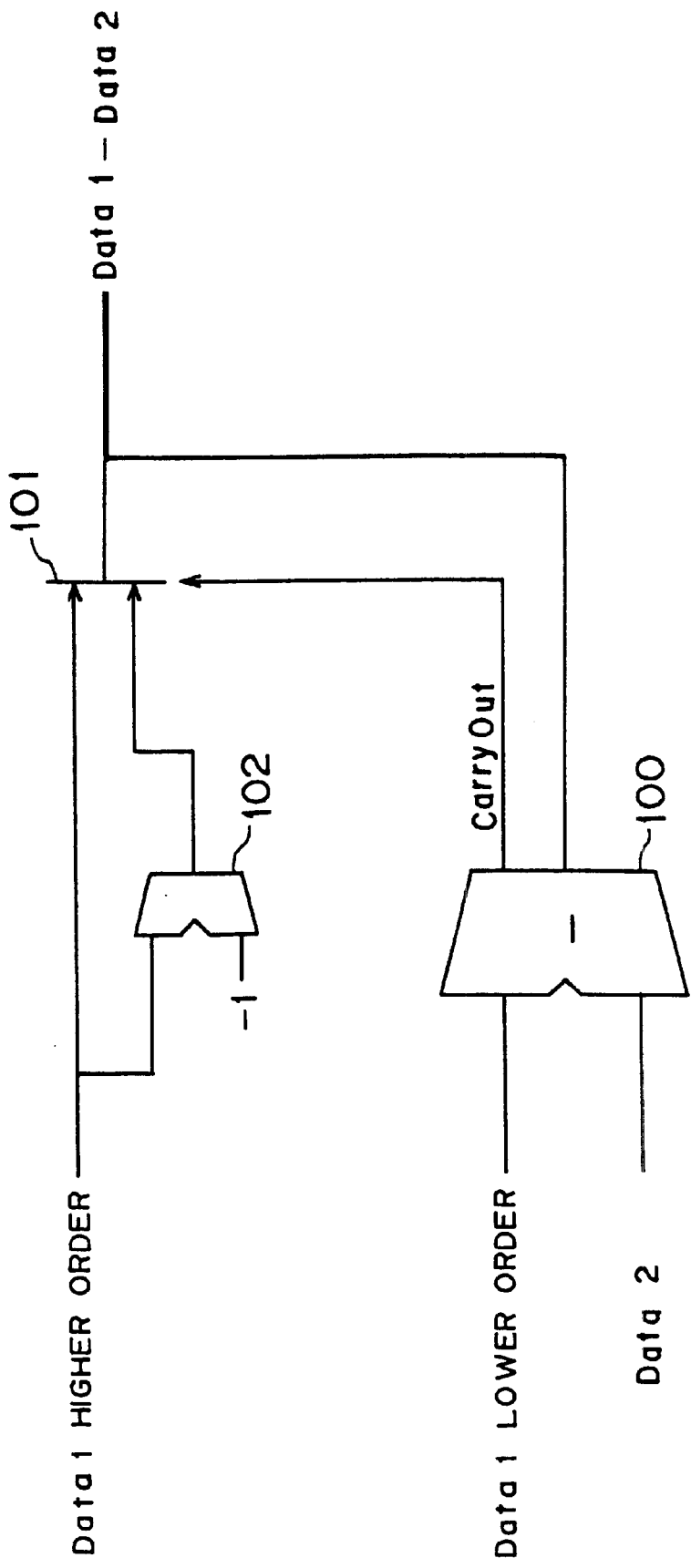
FIG. 20 shows an example of the configuration of the subtraction circuit when there is a difference in number of digits between two values.

FIG. 20 as well as FIG. 19 shows an example of the configuration of the subtraction circuit when there is a difference in number of digits between two values to be computed. In FIG. 20, a subtracter 100 computes the difference between the lower portion of the data 1 and the data 2, outputs the result, and provides for a selector 101 a carry, that is, a digit to be transferred if it exists, as a selection control signal. The selector 101 outputs the higher portion of the data 1 as is when there is no carry output, and outputs an output of a decrementer 102, that is, the result obtained by subtracting 1 from the higher portion of the data 1 when there is a carry output.

Figure 21:
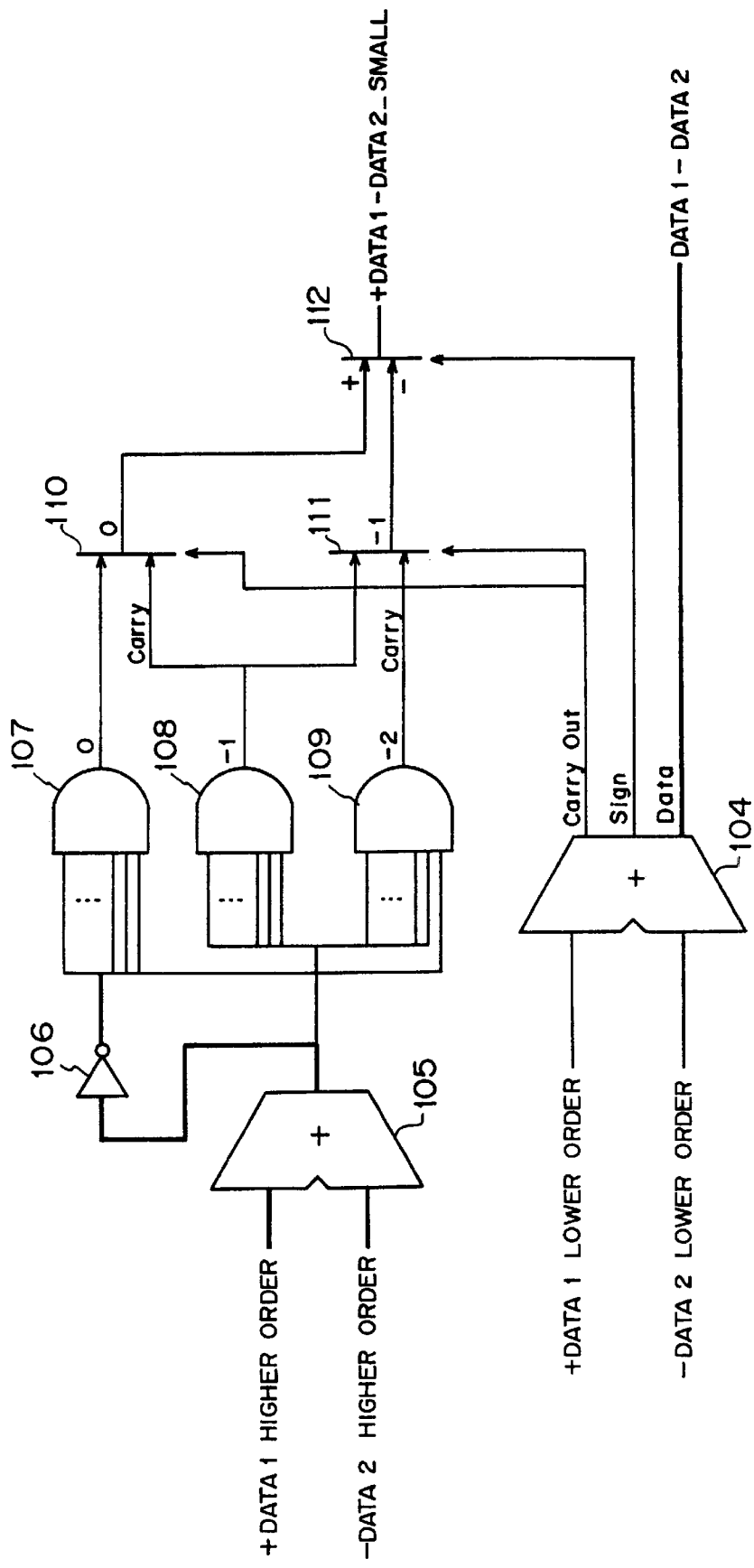
FIG. 21 shows an example of the configuration of the subtraction circuit for outputting the difference and the information about a small difference between two values when the difference between the two values is small.

FIG. 21 shows an example of the configuration of the subtraction circuit for outputting the difference itself and the notification that the difference is small between the data 1 and 2 when the difference is small. For example, in FIG. 3, if the difference between the instruction address IAR and the storage target address OAR is positive, and the difference is large enough, then there is no possibility for the overwrite of a subsequent instruction. When the data 1 is IAR, and the data 2 is OAR, it is necessary to determine whether or not there is a possibility for the overwrite of an instruction only if there is a small difference between the data 1 and 2. In this case, the subtraction circuit shown in FIG. 21 is used.

In FIG. 21, an adder 104 adds up the lower bits of the data 1 and the bit inversion result of the lower bits of the data 2, and outputs the lower portion of the subtraction result of the data 1 and 2, the sign, and a carry output. The sign of the subtraction result is provided as a selection control signal for a selector 112, and a carry output is provided as a selection control signal for selectors 110 and 111.

An adder 105 adds the higher bits of the data 1 and the inversion result of the higher bits of the data 2. As a result of subtracting the data 2 from the data 1, it is determined that the difference is small when the higher bits of the result are all 0, that is, the value of 0, and there is no carry as an operation result of the lower bits. In this case, the subtraction result between the data 1 and 2, that is, the output of the adder 105 is all inverted by an inverter 106, the higher bits are all 1, and the output of an AND gate 107 is 1. When there is no carry output from the adder 104, an output of the AND gate 107 is selected by the selector 110, the sign of the subtraction result output by the adder 104 is positive, thereby selecting the output of the selector 110 by the selector 112, and a signal DATA1–DATA2_SMALL indicating that the subtraction result of the data 1 and 2 is small is output from the selector 112.

In another case in which the subtraction result of the data 1 and 2 is positive, and the difference is small, the output of the adder 105 as a subtraction result of the higher bits is all 1, that is, the value of –1, and the carry output as an operation result of the lower bits is 1. In this case, the data portion of the higher bits is all 0. As a result, the difference between the data 1 and 2 is small. The output of an AND gate 108 is 1, and there is a carry output from the adder 104. Therefore, the selector 110 selects the output of the AND gate 108, and the selector 112 selects the output of the selector 110 because the sign of the output of the adder 104 is positive. Thus, the selector 112 outputs a signal indicating that the difference between the data 1 and 2 is small.

The cases in which the result of subtracting the data 2 from the data 1 is negative, and the absolute value is small is described below. In the first case, the output of the adder 105 is –1, that is, the higher bits are all 1, and there is no carry output from the lower bits. In this case, the output of the AND gate 108 is 1 as in the above described case, and there is no carry output from the adder 104. Therefore, the output of the AND gate 108 to the selector 111 is selected, and is provided for the selector 112. The selector 112 selects the output of the selector 111 because the sign of the operation result of the lower bits output by the adder 104 is negative, and a signal indicating that the difference between the data 1 and 2 is output by the selector 112.

In the second case, there is a carry output by the lower bits, only the lowest bit in the higher bits output from the adder 105 is 0, and all the other bits are 1 (that is, the value of –2). The inverted value of the lowest bit output the inverter 106 as the lowest bit is provided for an AND gate 109. As a result, the output of the AND gate 109 is 1, and there is a carry output from the adder 104. Therefore, the selector 111 selects the output of the AND gate 109, and provides it for the selector 112. The selector 112 selects the output from the selector 111 because the sign output by the adder 104 is negative, and the selector 112 outputs a signal indicating that the difference between the data 1 and 2 is small.

Figure 22:
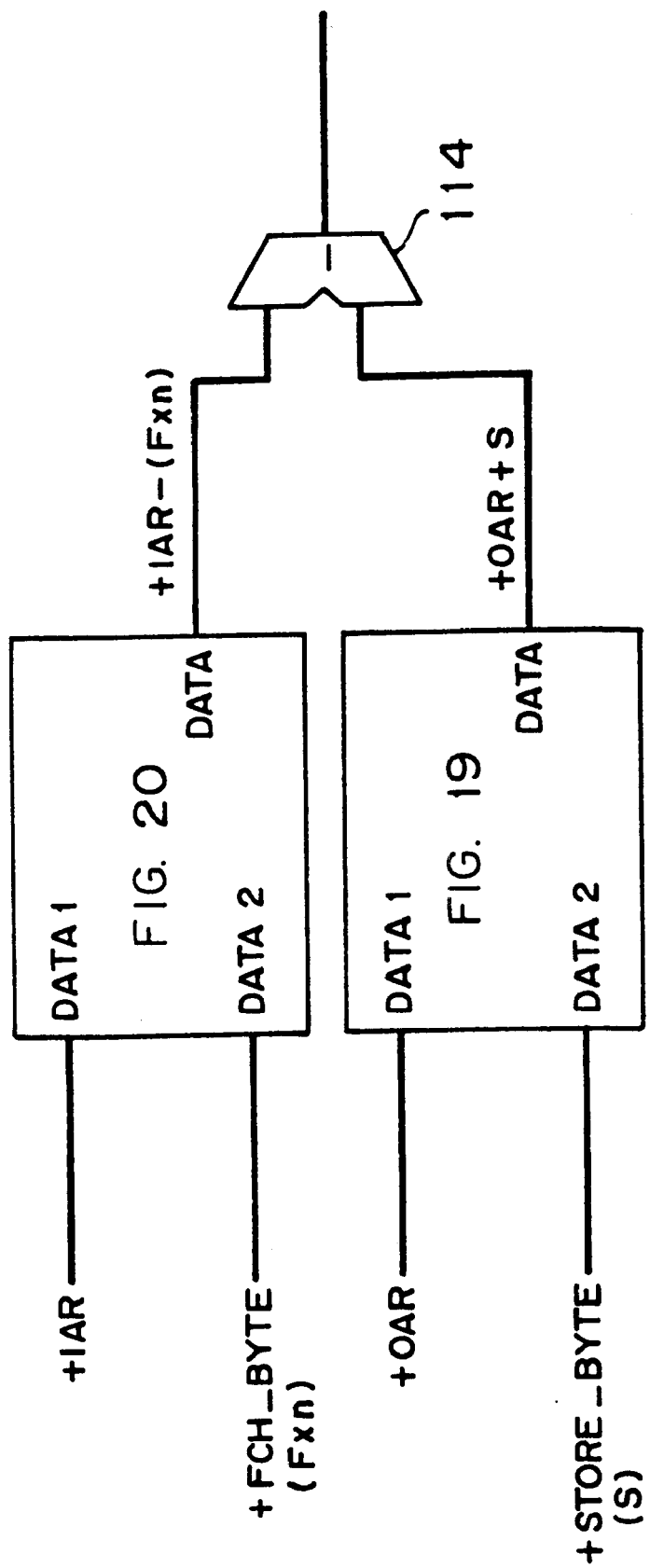
FIG. 22 shows an example of the configuration of the circuit for performing the same operations as the 4-input adder shown in FIG. 17 using the circuits shown in FIGS. 19 and 20.

As shown in FIG. 17, as compared with the case in which a 4-input adder is used as shown in FIG. 17, an example of the circuit in which simple operations circuit are used in combination as described above by referring to FIGS. 19 through 21 is explained below by referring to FIGS. 22 through 24. FIG. 22 shows an example of the configuration of the circuit for performing an operation similar to the operation performed by the 4-input adder shown in FIG. 17. In FIG. 22, the addition circuit shown in FIG. 19 is used to add up the OAR as the data 1 and the STORE_BYTE (S) as the data 2. The subtraction circuit shown in FIG. 20 is used to perform a subtracting operation between the IAR as the data 1 and the FCH_BYTE (fetch_byte, F×n) as the data 2. Then, the output of the subtracter 90 shown in FIG. 17 can be obtained by subtracting the IAR–(F×n) as an output of the circuit shown in FIG. 20 from the OAR+S as an output of the circuit shown in FIG. 19.

Figure 23:
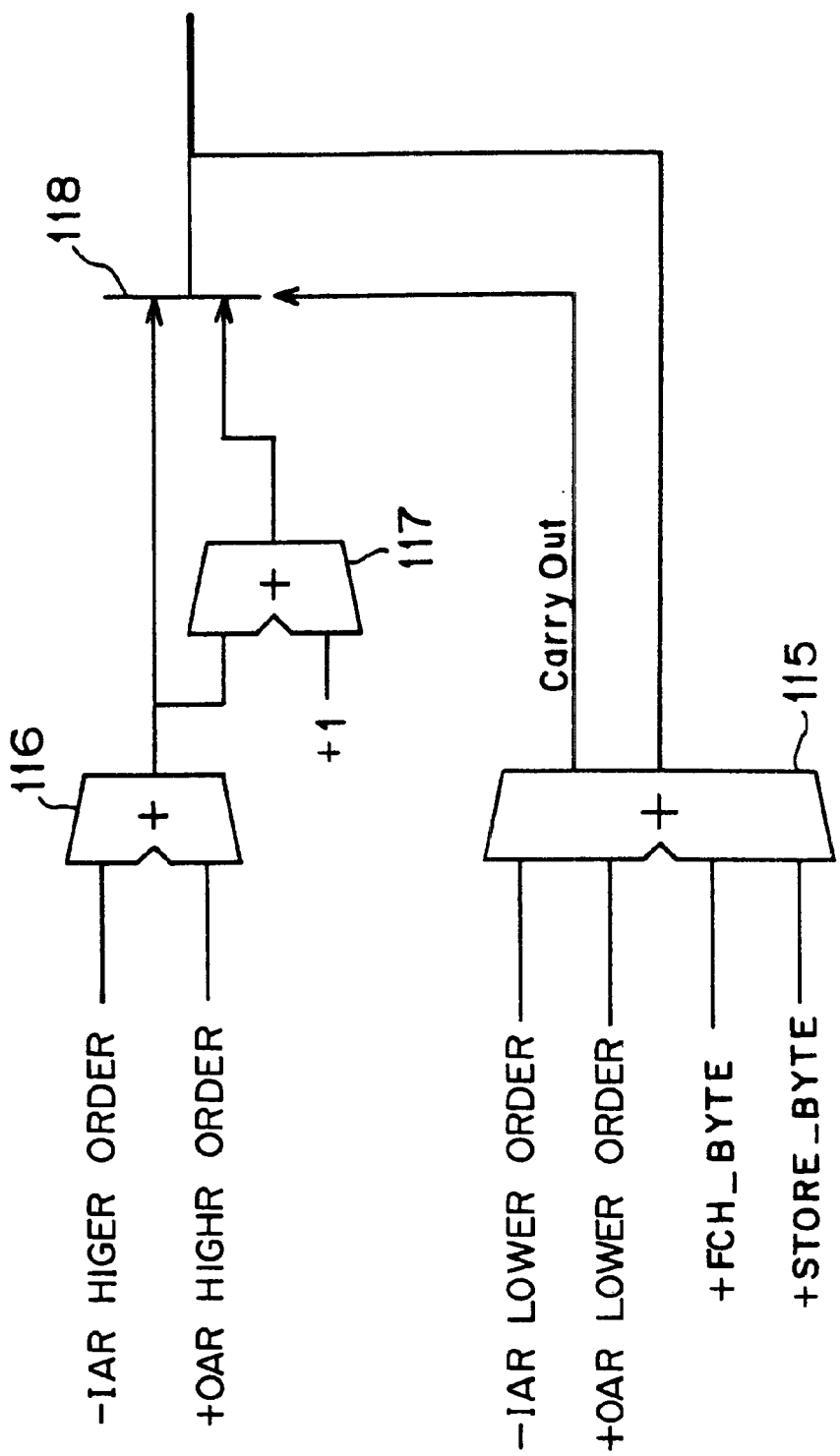
FIG. 23 shows an example of the configuration of the circuit for performing operations individually for an upper portion and a lower portion of the difference between an instruction address and an operand address, and for processing by the upper portion a carried output from the lower portion using an incrementer.

FIG. 23 shows an example of the configuration of the circuit for separately computing the higher and lower portions on the difference between the OAR and the IAR, and processing a carry output from the lower portion using the incrementer as shown in FIG. 19. With the configuration, it is possible to independently compute the higher and lower portions, and a high-speed computation can be realized by reducing the number of bits in operations.

In FIG. 23, an 4-input adder 115 performs an operation similar to that performed by the adder 90 shown in FIG. 17. However, an operation is performed only on the lower bits of the IAR and the OAR. An adder 116 adds up the higher bits of the OAR and the bit inversion result of the higher bits of the IAR. When there is no carry output from the 4-input adder 115, a selector 118 selects the addition result of the adder 116, and combines it with the operation result of the lower bits output from the adder 115, thereby outputting the result as an entire operation result. On the other hand, when there is a carry output from the 4-input adder 115, the output of the adder 116 is incremented by 1 by an incrementer 117. The result is selected by the selector 118, and combined with the lower portion output from the 4-input adder 115, and the result is output.

Figure 24:
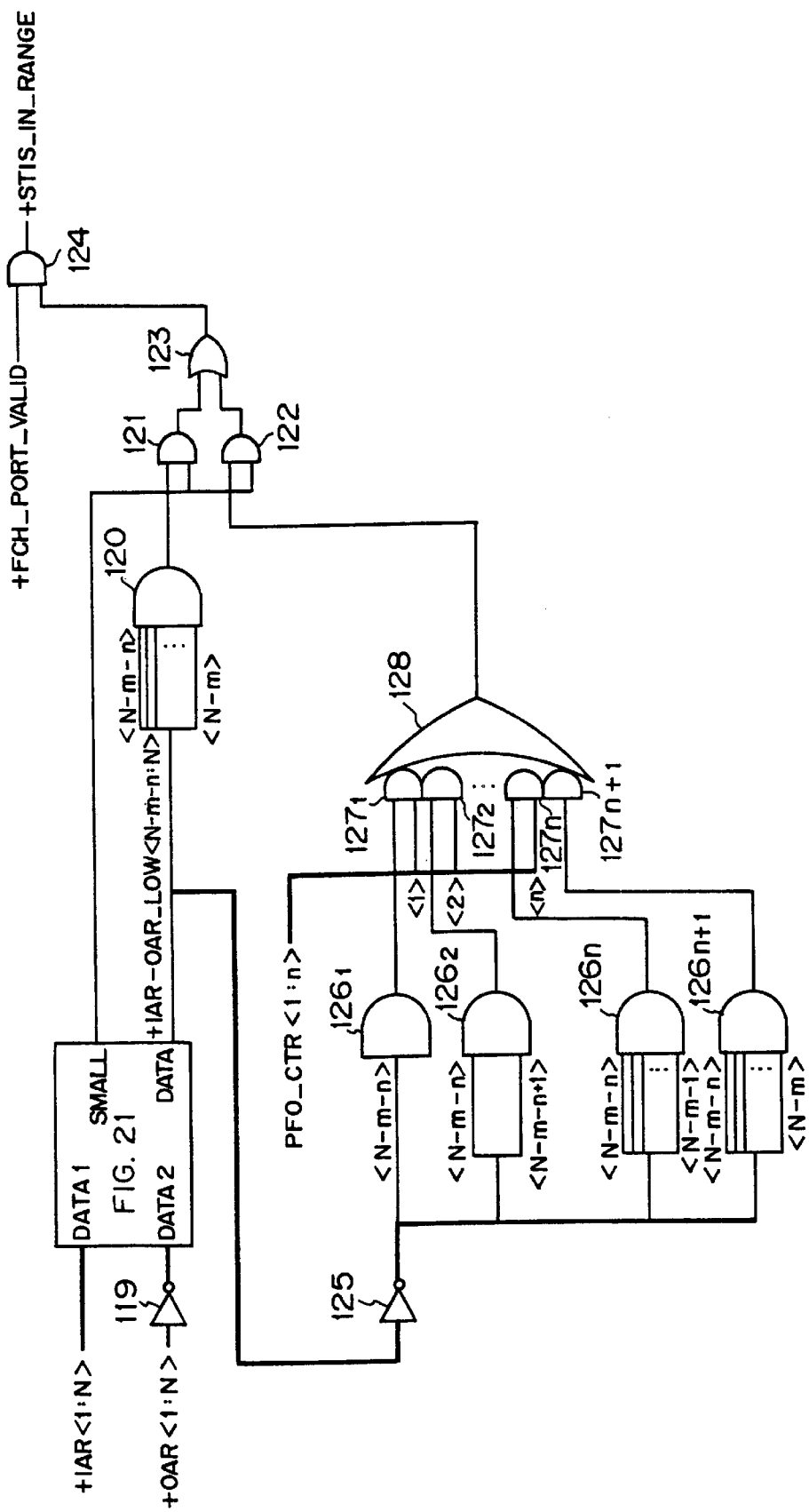
FIG. 24 shows an example of the configuration of the instruction overwrite possibility determination circuit using the subtraction circuit shown in FIG. 21.

FIG. 24 shows an example of the configuration of the instruction overwrite possibility determination unit using the circuit shown in FIG. 21. In FIG. 21, when there is a positive difference between the IAR and the OAR as shown in FIGS. 6 and 7, an AND/OR selector for discriminating the existence of the right inequality in the inequality (1) is used.

In FIG. 24, the IAR is provided as the data 1 for the circuit shown in FIG. 21, and the bit inversion result of the OAR by an inverter 119 is provided as the data 2. When there is a small difference between the IAR and the OAR, a signal indicating that the difference is small is provided for one input terminal of each of the two AND gates 121 and 122. At this time, (N−m−n) bit through (N−m) bit are provided for an AND gate 120 excluding the lower m bits in the operation result as the difference between the IAR and the OAR. When the difference is negative, and the absolute value is small, for example, m=4, and the values excluding the lower 4 bits are all 1, the output of the AND gate 120 is H, and is provided for an AND gate 124. At this time, if the FCH_PORT_VALID signal indicating that the fetch port is valid is H, then the STIS_IN_RANGE signal indicating that there is a possibility for the overwrite of an instruction corresponding to the port is H.

On the other hand, the operation result of the difference between the IAR and the OAR is bit-inverted by an inverter 125 corresponding to the case in which the result is positive, and is provided for the circuit similar to the circuit at the lower portion shown in FIG. 7, that is, a selector comprising AND gates $126_1$ through $126_{n+1}$, and an AND/OR selector to which the outputs of the AND gates $126_1$ through $126_{n+1}$ and the value of the prefetch counter are input, that is, comprising AND gates $127_1$ through $127_{n+1}$ and an OR gate 128. With the configuration, the difference between the IAR and the OAR is represented by the highest bit of (N−m−n) bit and the lowest bit of N bit, thereby inputting the output of the AND gate $126_1$, that is, the bit inversion result of the (N−m−n) bit to the AND gate $127_1$ unlike the case shown in FIG. 7.

An output of the AND gate $126_2$, that is, a logical product of the (N−m−n) bit and the inversion result of the (N−m−n+1) bit, as well as the second bit from the highest bit of the counter value of the prefetch counter is provided for the AND gates $127_2$.

The embodiments of the present invention have been described above in detail. Especially, as shown in FIGS. 18 through 21, the addition or subtraction when there is a difference in number of digits between the two values to be computed is used not only in computing the difference between the IAR and the OAR, but also in the operation between the IAR−OAR indicating large digit numbers and F×n having small digit numbers. Depending on a configuration method, the computation method can be used between the IAR and the F×n as information used on the instruction fetch side, and can be used between the IAR and the S as the information used on the operand access side, thereby combining the result through a common operations unit.

The present invention also has the following features.

When the length of an instruction sequence fetched in one fetching operation is fixed (F), the instruction fetch counter unit counts the times (n) of the fetching operations, and detects the length (F×n) of the instruction sequence. The instruction overwrite possibility determination unit determines that there is a possibility for the overwrite of an instruction when the following inequality exists using the F×n, the address (IAR) of an instruction at the specified position, the storage target address (OAR), and the data length (S) of the store data.

$$-F<IAR-OAR<F\times(n-1)+S$$

An instruction overwrite possibility determination unit comprises a subtraction unit for obtaining the difference between the address of an instruction at a specified position and a storage target address; and a selection unit selecting one of a plurality of logical products of a plurality of bits of a bit inversion result of an output of the subtraction unit as a selection control signal.

An information processing apparatus having one or more instruction fetch ports for fetching an instruction comprises a instruction sequence length detection unit for detecting the lengths of all instruction sequences subsequent to the last fetched instruction in the instructions fetched from one instruction fetch port by counting the times of an instruction fetching operation or accumulating the number of bytes fetched in each instruction fetching operation.

The instruction sequence length detection unit detects the length (L) of the subsequent instruction sequence. The address detection unit detects the address (IAR) of an instruction at the specified position and the storage target address (OAR). The instruction overwrite possibility determination unit determines that there is a possibility for the overwrite of an instruction using the L, the IAR, the OAR, the data length (S) of the store data, the maximum length (M) of the instruction sequence fetched in one instruction fetching operation when the following inequality exists.

$$-M<IAR-OAR<L+S$$

The instruction sequence length detection unit detects the length (L) of the subsequent instruction sequence. The address detection unit detects the address (IAR) of an instruction at the specified position and the storage target address (OAR). The instruction overwrite possibility determination unit determines that there is a possibility for the overwrite of an instruction using the L, the IAR, the OAR, and the data length (S) of the store data when the following inequality exists.

$$0<IAR-OAR<L+S$$

The information processing apparatus further comprises an instruction length reset unit for resetting the length of an instruction sequence detected by the instruction sequence length detection unit when the instructions in all the above described instruction sequences become unnecessary.

The information processing apparatus further comprises an instruction re-execution control unit for interrupting the execution of already fetched instructions subsequent to the storage target address immediately after the completion of the execution of the store instruction, and performing an operation subsequent to the operation of fetching correct instructions subsequent to the storage target address when the instruction overwrite possibility determination unit detects a possibility for the overwrite of an instruction.

The information processing apparatus further comprises an instruction execution completion control unit for simultaneously completing a plurality of instructions, when the instruction overwrite possibility determination unit determines a possibility for the overwrite of an instruction, if there is not a store instruction in a plurality of instructions which can be simultaneously completed from the point of the determination to the point of the completion of the store instruction, and for simultaneously completing the instructions up to the store instruction in the instruction execution order if there is a store instruction.

The instruction overwrite possibility determination unit comprises a multiple input addition unit adds up the bit inversion result of the address of an instruction at the specified position, the storage target address, and the output of the instruction fetch counter unit.

The multiple input addition unit furthermore adds the data length of the store data as an execution result stored in the storage target address.

As described above, according to the present invention, the determination as to whether or not there is a possibility for the overwrite of a subsequent instruction by writing data as an execution result of a store instruction, that is, the determination as to whether or not there is a possibility for the overwrite of an instruction, can be correctly made without lowering the instruction execution efficiency. Although instruction subsequent to a store instruction is actually overwritten, the overwritten instruction sequences can be correctly executed, thereby conspicuously improving the performance of the information processing apparatus.

What is claimed is:

1. An information processing apparatus which includes one or more instruction fetch ports for fetching an instruction, and detects a possibility for overwrite of an instruction fetched from the instruction fetch port, comprising:

an instruction fetch counter unit counting a length of an instruction sequence containing all instructions which are fetched before a last fetched instruction, said instructions and said last fetched instruction having sequential addresses; and an instruction overwrite possibility determination unit using an address of an instruction at a specified position in all instruction sequences, a storage target address at which an execution result of a completed store instruction is stored, and an output value of said instruction fetch counter unit, and detecting a possibility for overwrite of an instruction wherein: at least a part of a range of the storage target address overlaps the address of an instruction in all instruction sequences, and at least a part of the instruction sequences is overwritten.

2. The apparatus according to claim 1, wherein
said instruction overwrite possibility determination unit detects the possibility for the overwrite of an instruction using a length of store data as an execution result stored at the storage target address.

3. The apparatus according to claim 1, wherein:
said instruction overwrite possibility determination unit comprises a subtraction circuit outputting a correct subtraction result only when an absolute value of a subtraction result is small, comprising a upper subtraction circuit and a lower subtraction circuit independently preforming subtracting operations on higher bits and lower bits, and outputting an output of the lower subtraction circuit together with a signal indicating that an absolute value of a subtraction result is small depending on a carry output from the lower bit subtraction circuit and a sign of a subtraction result when an output of the upper subtraction circuit is 0, −1, or −2.

4. The apparatus according to claim 1, wherein:
said instruction overwrite possibility determination unit comprises an operations circuit performing an adding or subtracting operation when there is a difference in number of digits between two values to be computed, outputting an operation result by performing an adding or subtracting operation on equal to or larger than a data width of a small absolute value on a lower bit side, obtaining an operation result of an upper side by incrementing or decrementing by 1 a higher bit of a larger absolute value when there is a carry output from an operation result in a lower bit side, and outputting a higher bit of a larger absolute value as is as an addition or a subtraction result when there is no carry output.

5. The apparatus according to claim 1, wherein:
when a length of an instruction sequence fetched in one fetching operation is fixed F, said instruction fetch counter unit counts times n of the fetching operation, and detects the length F×n of the instruction sequence; and said instruction overwrite possibility determination unit determines that there is a possibility for the overwrite of an instruction when a following inequality exists using the F×n, an address IAR of an instruction at the specified position, the storage target address OAR, and a data length S of a store data $$-F < IAR - OAR < F \times (n-1) + S.$$

6. The apparatus according to claim 1, wherein
said instruction overwrite possibility determination unit comprises a subtraction unit obtaining a difference between an address of an instruction at the specified position and a storage target address; and a selection unit selecting one of a plurality of logical products of a plurality of bits of a bit inversion result of an output of said subtraction unit as a selection control signal.

7. An information processing apparatus which includes one or more instruction fetch ports for fetching an instruction, and detects a possibility for overwrite of an instruction fetched from the instruction fetch port, comprising:

an instruction sequence length detection unit detecting a length of an instruction sequence containing all instructions which are fetched before a last fetched instruction, said instructions and said last fetched instruction having sequential addresses;

an address detection unit detecting an address of an instruction at a specified position in all instruction sequences, and a storage target address at which an execution result of a completed store instruction is stored; and an instruction overwrite possibility determination unit using outputs from said instruction sequence length detection unit and said address detection unit, and detecting a possibility for the overwrite of an instruction wherein contents of an instruction in all instruction sequences can be overwritten by storing an execution result of the store instruction.

8. The apparatus according to claim 7, wherein
said instruction overwrite possibility determination unit detects a possibility for the overwrite of an instruction using a length of store data as an execution result of a store instruction stored at the storage target address.

9. The apparatus according to claim 7, wherein
said instruction sequence length detection unit detects a length of the instruction sequence by counting times of an instruction fetching operation in which a length of an instruction sequence to be fetched is fixed.

10. The apparatus according to claim 7, wherein
said instruction sequence length detection unit detects a length of the instruction sequence by adding up lengths of instruction sequences fetched in one instruction fetching operation.

11. The apparatus according to claim 7, further comprising
an instruction execution completion control unit completing instructions one by one when said instruction overwrite possibility determination unit determines that there is a possibility for the overwrite of an instruction from a point when the determination is made to a point when the store instruction is completed.

12. The apparatus according to claim 7, wherein:
said instruction overwrite possibility determination unit comprises a subtraction circuit outputting a correct subtraction result only when an absolute value of a subtraction result is small, comprising a upper subtraction circuit and a lower subtraction circuit independently preforming subtracting operations on higher bits and lower bits, and outputting an output of the lower subtraction circuit together with a signal indicating that an absolute value of a subtraction result is small depending on a carry output from the lower bit subtraction circuit and a sign of a subtraction result when an output of the upper subtraction circuit is 0, −1, or −2.

13. The apparatus according to claim 7, wherein:
said instruction overwrite possibility determination unit comprises an operations circuit performing an adding or subtracting operation when there is a difference in number of digits between two values to be computed, outputting an operation result by performing an adding or subtracting operation on equal to or larger than a data width of a small absolute value on a lower bit side, obtaining an operation result of an upper side by incrementing or decrementing by 1 a higher bit of a larger absolute value when there is a carry output from an operation result in a lower bit side, and outputting a higher bit of a larger absolute value as is as an addition or a subtraction result when there is no carry output.

14. The apparatus according to claim 7, wherein
said instruction sequence length detection unit for detects lengths of all instruction sequences subsequent to a last fetched instruction in instructions fetched from one instruction fetch port by counting times of an instruction fetching operation or accumulating a number of bytes fetched in each instruction fetching operation.

15. The apparatus according to claim 7, wherein:
said instruction sequence length detection unit detects a length L of the subsequent instruction sequence;
said address detection unit detects an address IAR of an instruction at the specified position and the storage target address OAR; and
said instruction overwrite possibility determination unit determines that there is a possibility for the overwrite of an instruction using the length of the subsequent instruction sequence L, the address IAR of an instruction at the specified position, and the storage target address OAR, the data length S of the store data, the maximum length M of the instruction sequence fetched in one instruction fetching operation when a following inequality exists $-M<IAR-OAR<L+S.$ 16. The apparatus according to claim 7, wherein:
said instruction sequence length detection unit detects a length L of the subsequent instruction sequence;
said address detection unit detects an address IAR of an instruction at the specified position and the storage target address OAR; and
said instruction overwrite possibility determination unit determines that there is a possibility for the overwrite of an instruction using the length of the subsequent instruction sequence L, the address IAR of an instruction at the specified position, and the storage target address OAR, and the data length S of the store data when a following inequality exists $0<IAR-OAR<L+S.$ 17. The apparatus according to claim 7, further comprising
an instruction length reset unit resetting a length of an instruction sequence detected by said instruction sequence length detection unit when the instructions in all the instruction sequences become unnecessary.

18. The apparatus according to claim 7, further comprising
an instruction re-execution control unit interrupting execution of already fetched instructions subsequent to the storage target address immediately after completion of execution of the store instruction, and performing an operation subsequent to an operation of fetching correct instructions subsequent to the storage target address when said instruction overwrite possibility determination unit detects a possibility for the overwrite of an instruction.

19. The apparatus according to claim 7, further comprising
an instruction execution completion control unit simultaneously completing a plurality of instructions, when said instruction overwrite possibility determination unit determines a possibility for the overwrite of an instruction, if there is not a store instruction in a plurality of instructions which can be simultaneously completed from a point of the determination to a point of completion of the store instruction, and simultaneously completing the instructions up to the store instruction in an instruction execution order if there is a store instruction.

20. The apparatus according to claim 7, further comprising
a multiple input addition unit adding up a bit inversion result of an address of an instruction at the specified position, the storage target address, and an output of said instruction fetch counter unit.

21. The apparatus according to claim 20, wherein
said multiple input addition unit furthermore adds a data length of store data as an execution result stored in the storage target address.

22. An information processing method for use in an information processing apparatus which includes one or more instruction fetch ports for fetching an instruction, and detects a possibility for overwrite of an instruction fetched from the instruction fetch port, comprising:
counting a length of an instruction sequence containing all instructions which are fetched before a last fetched instruction, said instructions and said last fetched instruction having sequential addresses; and
using an address of an instruction at a specified position in all instruction sequences, a storage target address at which an execution result of a completed store instruction is stored, and a length of the counted length of the instruction sequence, and detecting a possibility for overwrite of an instruction wherein: at least a part of a range of the storage target address overlaps the address of an instruction in all instruction sequences, and at least a part of the instruction sequences is overwritten.

23. An information processing method for use in an information processing apparatus which includes one or more instruction fetch ports for fetching an instruction, and detects a possibility for overwrite of an instruction fetched from the instruction fetch port, comprising:

detecting a length of an instruction sequence containing all instructions which are fetched before a last fetched instruction, said instructions and said last fetched instruction having sequential addresses;

detecting an address of an instruction at a specified position in all instruction sequences, and a storage target address at which an execution result of a completed store instruction is stored; and detecting a possibility for the overwrite of an instruction in which contents of an instruction in all instruction sequences are overwritten by storing an execution result of the store instruction using the detected length of an instruction sequence, an address of an instruction at a specified position, and a storage target address.

24. An information processing apparatus which includes one or more instruction fetch ports for fetching an instruction, and detects a possibility for overwrite of an instruction fetched from the instruction fetch port, comprising:

instruction fetch counter means for counting a length of an instruction sequence containing all instructions which are fetched before a last fetched instruction, said instructions and said last fetched instruction having sequential addresses; and instruction overwrite possibility determination means for using an address of an instruction at a specified position in all instruction sequences, a storage target address at which an execution result of a completed store instruction is stored, and an output value of said instruction fetch counter means, and detecting a possibility for overwrite of an instruction wherein: at least a part of a range of the storage target address overlaps the address of an instruction in all instruction sequences, and at least a part of the instruction sequences is overwritten.

25. An information processing apparatus which includes one or more instruction fetch ports for fetching an instruction, and detects a possibility for overwrite of an instruction fetched from the instruction fetch port, comprising:

instruction sequence length detection means for detecting a length of an instruction sequence containing all instructions which are fetched before a last fetched instruction, said instructions and said last fetched instruction having sequential addresses;

address detection means for detecting an address of an instruction at a specified position in all instruction sequences, and a storage target address at which an execution result of a completed store instruction is stored; and instruction overwrite possibility determination means for using outputs from said instruction sequence length detection means and said address detection means, and detecting a possibility for the overwrite of an instruction wherein contents of an instruction in all instruction sequences can be overwritten by storing an execution result of the store instruction.

* * * * *